(12) United States Patent
Hyung et al.

(10) Patent No.: US 8,808,900 B2
(45) Date of Patent: Aug. 19, 2014

(54) CYLINDRICAL LITHIUM ION SECONDARY BATTERY

(75) Inventors: Yoo Eup Hyung, Yongin-si (KR); Seok Gyun Chang, Yongin-si (KR); Soon Ki Woo, Yongin-si (KR); Youn Han Chang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 526 days.

(21) Appl. No.: 12/975,319

(22) Filed: Dec. 21, 2010

(65) Prior Publication Data

US 2011/0091748 A1    Apr. 21, 2011

Related U.S. Application Data

(62) Division of application No. 11/394,369, filed on Mar. 29, 2006, now Pat. No. 7,879,484.

(30) Foreign Application Priority Data

Mar. 30, 2005 (KR) .................. 10-2005-0026409
May 3, 2005 (KR) .................. 10-2005-0037287
Jul. 7, 2005 (KR) .................. 10-2005-0061399

(51) Int. Cl.
*H01M 6/00* (2006.01)
*H01M 2/18* (2006.01)
*H01M 2/00* (2006.01)
*H01M 2/02* (2006.01)

(52) U.S. Cl.
USPC ............ 429/122; 429/133; 429/163; 429/164

(58) Field of Classification Search
None
See application file for complete search history.

(56) References Cited

U.S. PATENT DOCUMENTS

| 1,402,711 A | 1/1922 | Boyle |
| 4,259,656 A | 3/1981 | Smith |
| 4,673,909 A | 6/1987 | Schwob et al. |
| 4,865,793 A | 9/1989 | Suzuki et al. |

(Continued)

FOREIGN PATENT DOCUMENTS

| CN | 1574420 A | 2/2005 |
| JP | 11-191436 | 7/1999 |

(Continued)

OTHER PUBLICATIONS

European Search Report dated May 31, 2006 for European application EP 06 11 1664.
SIPO Office action dated Jan. 4, 2008, for corresponding Chinese Patent application 200610071596.X, with English translation.

(Continued)

*Primary Examiner* — Barbara Gilliam
*Assistant Examiner* — Adam A Arciero
(74) *Attorney, Agent, or Firm* — Christie, Parker & Hale, LLP

(57) ABSTRACT

A cylindrical lithium ion secondary battery includes an electrode assembly; a center pin positioned within the electrode assembly and having upper and lower ends that are closed; a can containing the electrode assembly and the center pin; and a cap assembly coupled to the top of the can. The center pin can include a body extending a predetermined length with its upper and lower end open and at least one closure member adapted to close the upper and lower ends of the body and to melt or fracture at a predetermined temperature. The center pin body may also or alternatively include a circuit member positioned inside the center pin and adapted to be short-circuited in the case of overcharging and to consume current.

4 Claims, 17 Drawing Sheets

(56) References Cited

U.S. PATENT DOCUMENTS

| | | | |
|---|---|---|---|
| 4,975,341 A | | 12/1990 | Tucholski et al. |
| 4,992,339 A | * | 2/1991 | Georgopoulos ................ 429/7 |
| 5,460,904 A | | 10/1995 | Gozdz et al. |
| 6,136,475 A | | 10/2000 | Tsutsumi et al. |
| 6,632,572 B1 | | 10/2003 | Yasutake et al. |
| 6,673,257 B1 | | 1/2004 | Hudson |
| 7,534,522 B2 | * | 5/2009 | Chang et al. ................ 429/82 |
| 7,749,642 B2 | * | 7/2010 | Chang et al. ................ 429/54 |
| 7,858,218 B2 | * | 12/2010 | Chang et al. ................ 429/82 |
| 7,879,484 B2 | * | 2/2011 | Hyung et al. ................ 429/122 |
| 2001/0019796 A1 | | 9/2001 | Kang et al. |
| 2001/0055712 A1 | | 12/2001 | Cittanova |
| 2002/0006540 A1 | | 1/2002 | Enomoto et al. |
| 2003/0027036 A1 | * | 2/2003 | Emori et al. ................ 429/61 |
| 2003/0082441 A1 | * | 5/2003 | Hovi et al. ................ 429/123 |
| 2003/0148175 A1 | | 8/2003 | Iwanaga et al. |
| 2004/0081895 A1 | | 4/2004 | Adachi et al. |
| 2005/0250007 A1 | | 11/2005 | Abe et al. |

FOREIGN PATENT DOCUMENTS

| | | | |
|---|---|---|---|
| JP | 2000-067847 | | 3/2000 |
| JP | 2000067847 A | * | 3/2000 |
| JP | 2002-373706 | | 12/2002 |
| JP | 2003-036888 | | 2/2003 |
| JP | 2003-223886 | | 8/2003 |
| KR | 10-2002-0021065 | | 3/2002 |
| WO | WO 2004/012295 A1 | | 2/2004 |

OTHER PUBLICATIONS

English Machine Translation of Japanese Publication No. JP 2003-036888 listed above, 13 pages.
English Machine Translation of Japanese Publication No. JP 2003-223886 listed above, 10 pages.
Japanese Office Action dated Jun. 19, 2012 issued in Japanese Application No. 2009-281801, 3 pages.
U.S. Office action dated Nov. 6, 2009, for cross reference U.S. Appl. No. 11/394,369 (now U.S. Patent 7,879,484), (12 pages).
U.S. Office action dated Apr. 16, 2008, for cross reference U.S. Appl. No. 11/394,171(now U.S. Patent 7,534,522), (13 pages).
U.S. Office action dated Oct. 20, 2008, for cross reference U.S. Appl. No. 11/394,171 (now U.S. Patent 7,534,522), (13 pages).
U.S. Notice of Allowance dated Jan. 12, 2009, for cross reference U.S. Appl. No. 11/394,171 (now U.S. Patent 7,534,522), (7 pages).
U.S. Office action dated Aug. 3, 2009, for cross reference U.S. Appl. No. 12/470,440 (now U.S. Patent 7,749,642), (16 pages).
U.S. Notice of Allowance dated Feb. 22, 2010, for cross reference U.S. Appl. No. 12/470,440 (now U.S. Patent 7,749,642), (8 pages).
U.S. Office action dated May 26, 2010, for cross reference U.S. Appl. No. 11/394,369 (now U.S. Patent 7,879,484), (13 pages).
U.S. Office action dated Jun. 7, 2010, for cross reference U.S. Appl. No. 12/353,931 (now U.S. Patent 7,858,218), (10 pages).
U.S. Notice of Allowance dated Sep. 29, 2010, for cross reference U.S. Appl. No. 11/394,369 (now U.S. Patent 7,879,484), (9 pages).
Hyung et al., *Flame-retardant additives for lithium-ion batteries*, Jun. 2003, Journal of Power Sources, vol. 119-121, pp. 383-387.

\* cited by examiner

CYLINDRICAL LITHIUM ION SECONDARY BATTERY

CROSS-REFERENCE TO RELATED APPLICATIONS

This application is a divisional of U.S. patent application Ser. No. 11/394,369, filed Mar. 29, 2006, which claims priority to and the benefit of Korean Patent Application Nos. 10-2005-0026409, filed on Mar. 30, 2005; 10-2005-0037287, filed on May 3, 2005; and 10-2005-0061399, filed on Jul. 7, 2005, the entire contents of which are incorporated herein by reference.

BACKGROUND OF THE INVENTION

In order to prevent a typical cylindrical lithium ion secondary battery from exploding in the case of overcharging, it is provided with a safety vent, which deforms when the internal pressure rises due to overcharging, and a circuit board, which interrupts the current as the safety vent deforms. The safety vent and the circuit board are also referred to as CIDs (current interruption devices) as a whole and constitute the cap assembly.

The operation of the safety vent and the circuit board of a cylindrical lithium ion secondary battery will now be described in more detail.

When a cylindrical lithium ion secondary battery is overcharged, the electrolyte evaporates approximately from the upper region of the electrode assembly and the resistance begins to increase. In addition, lithium precipitates and deformation begins to occur approximately from the central region of the electrode assembly. The increase of resistance in the upper region of the electrode assembly causes local heating and abruptly raises the battery temperature.

In this state, the action of cyclo hexyl benzene (CHB) and biphenyl (BP) (electrolyte additive), which generally decomposes and generate gas in the case of overcharging, rapidly increases the internal pressure. Such internal pressure pushes the safety vent, which is one of the components of the cap assembly, outwards (i.e., deforms it outwards). As a result, the circuit board positioned thereon is fractured and interrupts the current. Particularly, the wiring pattern formed on the circuit board is broken and no current flows any longer. Such interruption of current ends the overcharging state and prevents the battery from heating, leaking, smoking, exploding, or catching fire.

When the internal pressure of the battery rises above a critical level due to overcharging, the safety vent itself is torn off and evacuates internal gas to the exterior.

Meanwhile, a void volume or dead volume generally exists inside the battery. In particular, the empty space between the electrode assembly and the cap assembly or that inside the center pin may be referred to as a void volume. Such a void volume is thought to be one of the reasons the time of deformation or fracture of the safety vent is delayed. In other words, the void volume is thought to delay the current interruption time and degrade the stability of the battery.

It is known in the art that, when the safety vent inside the battery deforms (or the circuit board fractures) at a pressure of about 5-11 $kgf/cm^2$ and the void volume is about 2 ml, for example, the amount of gas necessary for deformation of the safety vent is about 10-22 ml, although there may be some variance depending on the type of the battery. However, even when cyclo hexyl benzene (CHB) completely decomposes, which is included in the electrolyte at a ratio of 0.7% based on calculation, gas of about 4.116 ml is generated and, even when 0.3% of biphenyl (BP) completely decomposes, gas of about 1.833 ml is generated. In addition, about 1.5 ml of gas is additionally generated in the degassing process. The total sum of gas from three different sources, however, is no more than about 7.449 ml and applies a force of about 3.75 $kgf/cm^2$ to the safety vent. In summary, although a pressure of about 5-11 $kgf/cm^2$ is necessary to deform the safety vent or break the circuit board in the case of overcharging, the void volume can actually provide only about 3.75 $kgf/cm^2$. As a result, the safety vent is not operated or the operation time is delayed. This means that the current interruption time is delayed in the case of overcharging. The resulting problem is that overcharging further proceeds as long as time is delayed, the battery temperature further rises, and the battery is very likely to explode or catch fire. Although the amount of gas generated in the case of overcharging may become larger by increasing the amount of cyclo hexyl benzene (CHB) or biphenyl (BP), which is an additive to the electrolyte, there is a trade-off between degradation of capacity, life, and quality of the battery.

SUMMARY OF THE INVENTION

A cylindrical lithium ion secondary battery according to one embodiment includes an electrode assembly; a center pin positioned within the electrode assembly, the center pin having upper and lower ends that are closed; a can containing the electrode assembly and the center pin; and a cap assembly coupled to the top of the can. In one embodiment, the can has a void volume or dead volume formed therein only in a region between the electrode assembly, the center pin, and the cap assembly.

The center pin may include a body extending a predetermined length with its upper and lower end open and at least one closure member adapted to close the upper and lower ends of the body and to melt or fracture at a predetermined temperature. The body may include any one material chosen from a group consisting of steel, stainless steel, and aluminum. The at least one closure member may also be adapted to melt or fracture at a temperature of 80-120° C. In one embodiment, the body has tapers formed on the upper and lower ends thereof, respectively.

The at least one closure member may be a high-molecular resin; at least one material chosen from a group consisting of polyethylene, epoxy, acetal, and indium; or may have a thickness of 1-200μm. In some embodiments, the at least one closure member has a thickness of 25-75μm. The at least one closure member may be a film enclosing the entire body, including its upper and lower ends, in a shape of an envelope around the body. The at least one closure member may also include a docking portion coupled to the body, a taper portion outwardly projecting by a predetermined length from the docking portion, and a film substantially blocking an opening to the body, the film formed between the docking portion and the taper portion.

The center pin may be penetrated by a slit formed along a longitudinal direction of the body or may have at least one through-hole formed on the body.

The at least one closure member may be a cap which covers the upper and lower ends of the body.

The center pin may have a gasification member positioned inside the body, the gasification member adapted to decompose at a predetermined voltage or higher and to generate gas. The gasification member may decompose at a voltage of 4-4.5V or higher and gasify, and may include at least one material chosen from a group consisting of cyclo hexyl benzene (CHB) and biphenyl (BP).

In one embodiment, the center pin has a non-flammable member formed inside the body. The non-flammable member may include at least one material chosen from a group consisting of a magnesium hydroxide-based material, an aluminum hydroxide-based material, a halogen-based material, an antimony trioxide-based material, a melamine-based material, and a phosphate-based material.

The cap assembly may include a safety vent positioned on top of the center pin and a circuit board positioned on top of the safety vent, and may be operated within 2-10 minutes, when the charging voltage is 4-4.5V or higher, to interrupt current of the circuit board. In one embodiment, the battery is adapted to maintain a surface temperature of 30-60° C., when the charging voltage is 4-4.5V or higher, and stop charging.

One embodiment of a cylindrical lithium ion secondary battery includes an electrode assembly; a center pin positioned within the electrode assembly; a circuit member contained in the center pin and adapted to be short-circuited when a charging voltage is equal to or larger than a reference voltage; a can receiving the electrode assembly and the center pin, which contains the circuit member; and a cap assembly coupled to a top of the can.

The circuit member may include a reference voltage source for providing a reference voltage; a voltage comparator adapted to receive the reference voltage from the reference voltage source via a terminal, to receive a battery voltage via another terminal, and to output a short-circuit signal when the battery voltage is larger than the reference voltage; and a short-circuit switch connected in parallel to the battery and adapted to be toggled to an on setting by the short-circuit signal from the voltage comparator and to cause the battery to be short-circuited. The reference voltage provided by the reference voltage source may be set in a range of 4-5V.

In one embodiment, the short-circuit switch is a transistor with a collector and an emitter connected in parallel to the battery, and a base connected to an output terminal of the voltage comparator. A heating member may be connected between the battery and the emitter of the transistor. The heating member may have a gasification member mounted thereon, which gasifies at a predetermined temperature and increases an internal pressure of the battery. The heating member may also have a non-flammable member mounted thereon, which gasifies at a predetermined temperature and suppresses an occurrence of fire.

The heating member may be a fuse which melts and is cut off in its operation when the gasification member completely gasifies and the temperature reaches 200-300° C. The gasification member may include at least one material chosen from the group consisting of cyclo hexyl benzene (CHB) and biphenyl (BP). The non-flammable member may include at least one material chosen from the group consisting of a magnesium hydroxide-based material, an aluminum hydroxide-based material, a halogen-based material, an antimony trioxide-based material, a melamine-based material, and a phosphate-based material.

In one embodiment, a ground switch is connected to the reference voltage source to ground the reference voltage source, after the voltage comparator outputs a short-circuit signal, so that the reference voltage provided by the reference voltage source drops to 0V. The ground switch may be a transistor with a collector and an emitter connected between the reference voltage source and the ground, and the base is connected to an output terminal of the voltage comparator.

In one embodiment, the cap assembly includes a safety vent positioned on top of the center pin and a circuit board positioned on top of the safety vent.

In another embodiment, the circuit member includes a circuit board positioned inside the center pin and having a number of electronic components mounted thereon; a first conductive tab for connecting an end of the circuit board to the safety vent; and a second conductive tab for connecting another end of the circuit board to the can.

Yet another embodiment of a cylindrical lithium ion secondary battery includes an electrode assembly; a center pin positioned within a center of the electrode assembly; and a circuit member positioned inside the center pin and adapted to be short-circuited in the case of overcharging and to consume current. The circuit member may cause the battery to be short-circuited when a sensed battery voltage is larger than a predetermined reference voltage.

In one embodiment, the circuit member has a gasification member mounted thereon, wherein the gasification member is decomposed by heat generated by a short circuit and increases internal pressure of the battery. The circuit member may also have a non-flammable member mounted thereon, wherein the non-flammable member is decomposed by heat generated by a short circuit and suppresses an occurrence of fire.

BRIEF DESCRIPTION OF THE DRAWINGS

The above and other features and aspects of the present invention will be more apparent from the following detailed description taken in conjunction with the accompanying drawings, in which.

DETAILED DESCRIPTION

Figure 1A:
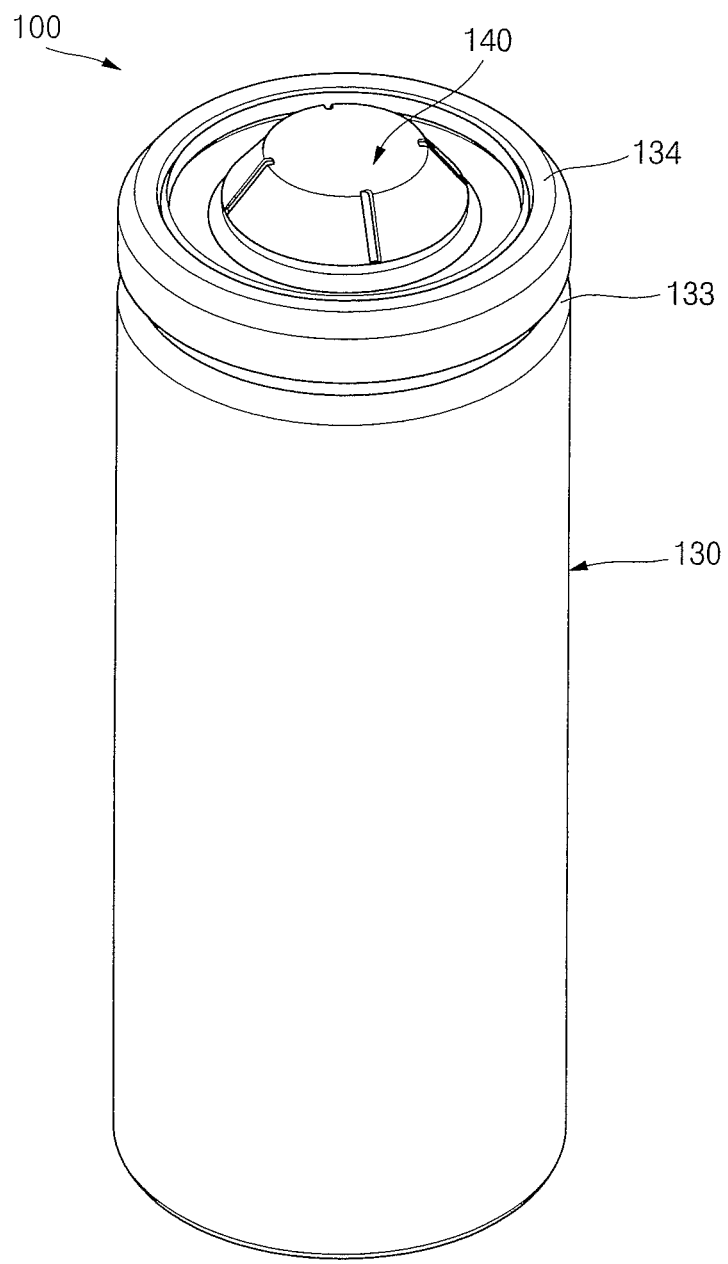
FIG. 1A is a perspective view showing a cylindrical lithium ion secondary battery according to an embodiment of the present invention.

Hereinafter, various embodiment of the present invention will be described with reference to the accompanying drawings. In the following description and drawings, the same reference numerals are used to designate the same or similar components, and so repetition of the description on the same or similar components will be omitted.

Figure 1B:
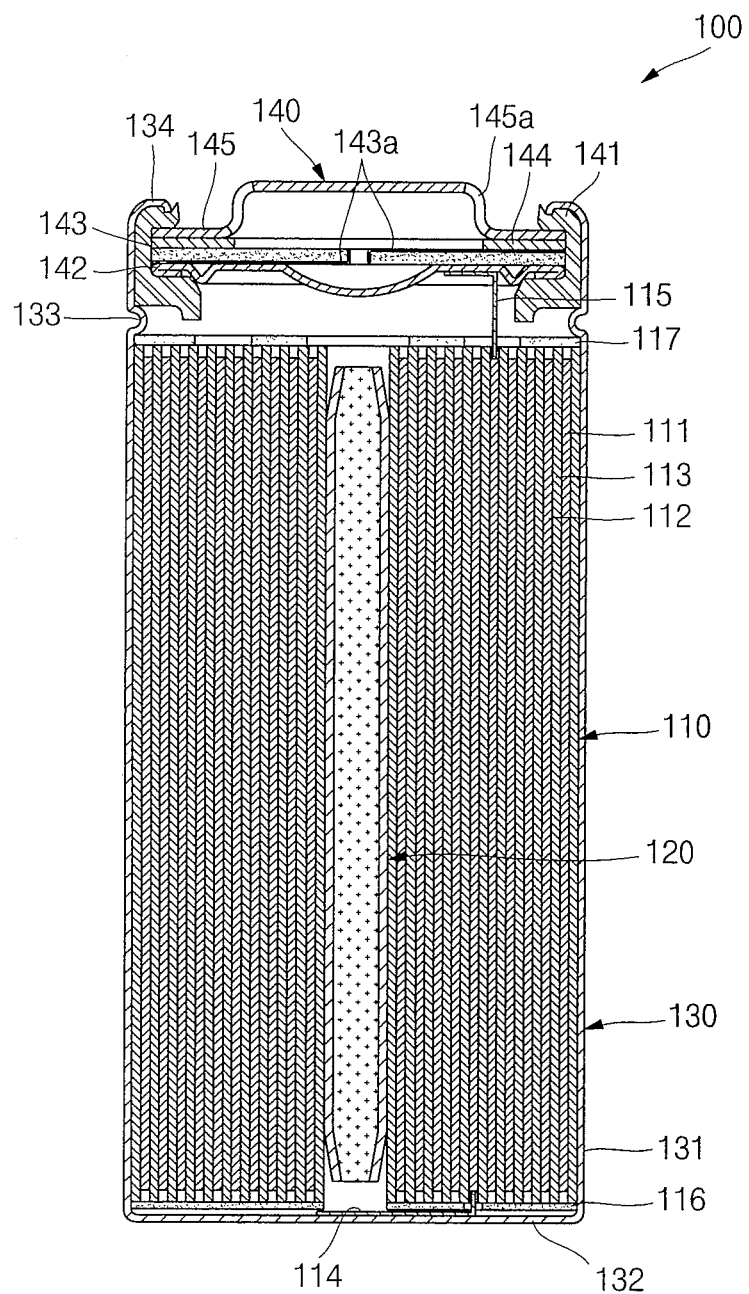
FIG. 1B is a sectional view showing a cylindrical lithium ion secondary battery according to an embodiment of the present invention.
Figure 1C:
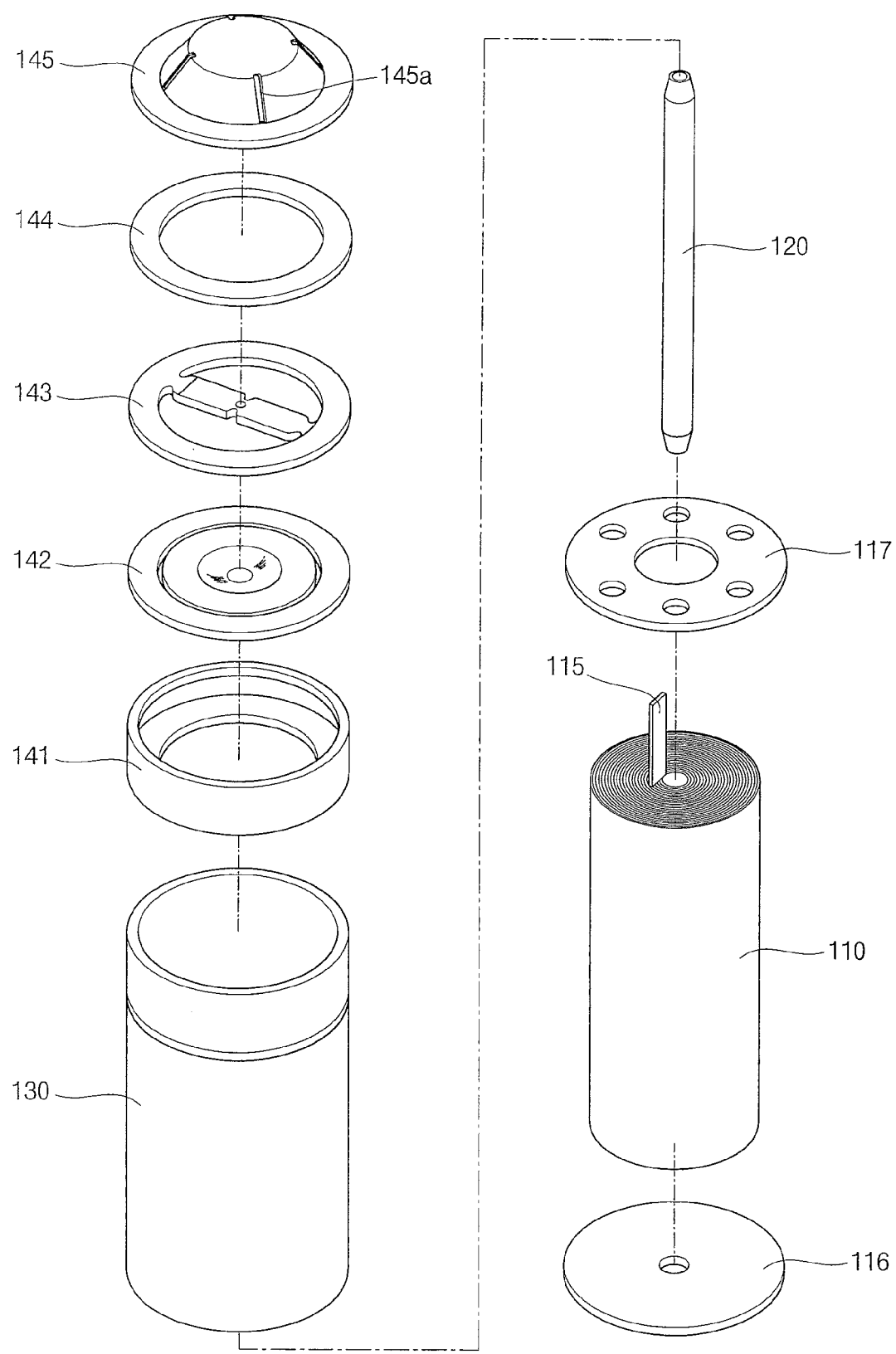
FIG. 1C is an exploded perspective view showing a cylindrical lithium ion secondary battery according to an embodiment of the present invention.
Figure 1D:
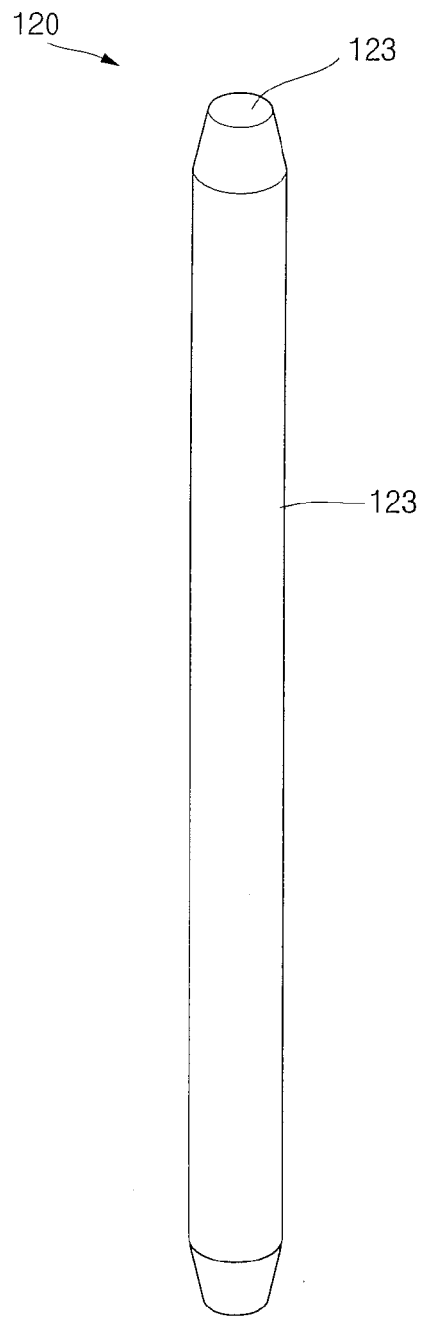
FIG. 1D is a perspective view magnifying a functional center pin.
Figure 1E:
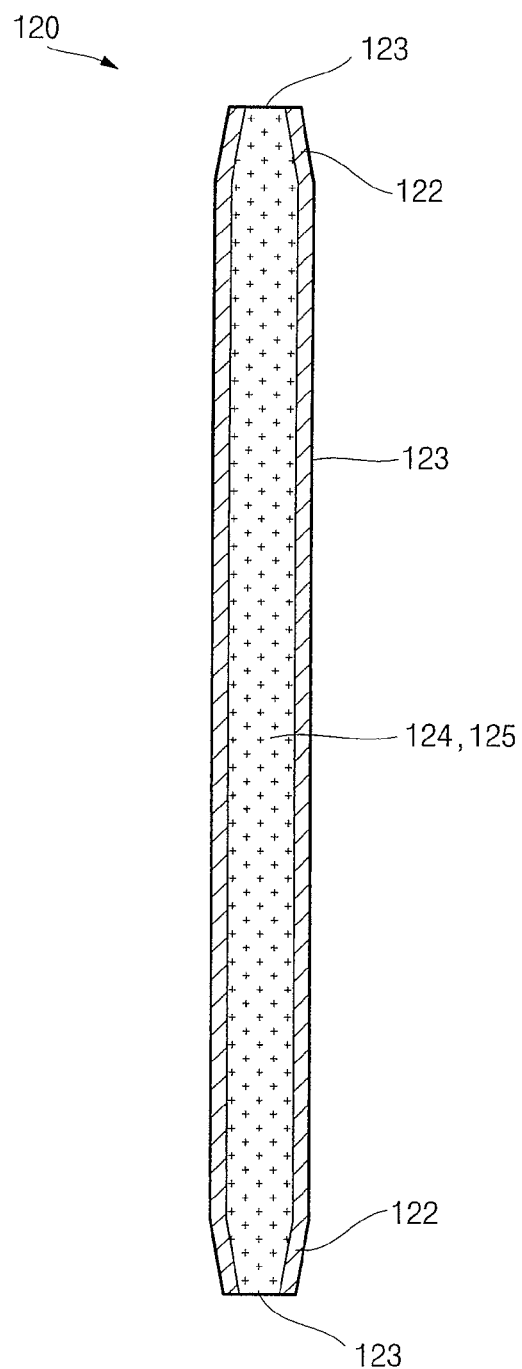
FIG. 1E is a sectional view magnifying a functional center pin.

Referring to FIGS. 1A, 1B, and 1C, a perspective view, a sectional view, and an exploded perspective view showing a cylindrical lithium ion secondary battery according to an embodiment of the present invention are illustrated, respectively. Referring to FIGS. 1D and 1E, a perspective view and a sectional view magnifying a functional center pin are illustrated, respectively.

As shown in FIGS. 1A, 1B, and 1C, a cylindrical lithium ion secondary battery 100 according to the present invention includes an electrode assembly 110, a center pin 120 coupled to the electrode assembly 110 with its upper and lower ends closed, a can 130 for containing the electrode assembly 110 and the center pin 120, and a cap assembly 140 for covering the top of the can 130.

The electrode assembly 110 includes a negative electrode plate 111 coated with a negative electrode active material (for example, graphite, carbon, etc.), a positive electrode plate 112 coated with a positive electrode active material (for example, transition metal oxide including $LiCoO_2$, $LiNiO_2$, and $LiMn_2O_4$), and a separator 113 positioned between the negative and positive electrode plates 111 and 112 to avoid a short circuit and allow only lithium ions to move. The negative and positive electrode plates 111 and 112 and the separator 113 are wound approximately into the shape of a cylinder and are contained in the can 130. The negative electrode plate 111 may be made of copper (Cu) foil, the positive electrode plate 112 may be made of aluminum (Al) foil, and the separator 113 may be made of polyethylene (PE) or polypropylene (PP), but the material is not limited in the present invention. The negative electrode plate 111 may have a negative electrode tab 114 welded thereto while protruding a predetermined length downwards and the positive electrode plate 112 may have a positive electrode tab 115 welded thereto while protruding a predetermined length upwards, or vice versa. The negative electrode tab 114 may be made of nickel (Ni) material and the positive electrode tab 115 may be made of aluminum (Al) material, but the material is not limited herein.

The center pin 120 is coupled approximately to the center of the electrode assembly 110 to prevent it from deforming during charging/discharging of the battery. The upper and lower ends of the center pin 120 are closed to minimize the void volume (or dead volume) inside the can 130. According to the prior art, however, the upper and lower ends of the center pin 120 are open and the interior of the center pin 120 also acts as the void volume (or dead volume). This is a major improvement of the present invention over the prior art. The structure and operation of the center pin 120 will be described later in more detail.

The can 130 approximately has the shape of a cylinder. In particular, the can 130 has a cylindrical surface 130 having a predetermined diameter and a bottom surface 132 formed on the lower part of the cylindrical surface 131 approximately in the shape of a disk. The top of the can 130 is open so that the electrode assembly 110 and the center pin 120 can be directly inserted downwards into the can 130 via the top thereof. The negative electrode tab 114 of the electrode assembly 110 can be welded to the bottom surface 132 of the cylindrical can 130. In this case, the cylindrical can 130 acts as the negative electrode. Alternatively, the positive electrode tab 115 may be welded to the bottom surface 132 of the cylindrical can 130, which then acts as the positive electrode. Lower and upper insulation plates 116 and 117 are positioned on the lower and upper surfaces of the electrode assembly 110, respectively, to avoid any unnecessary short circuit between the electrode assembly 110 and the cylindrical can 130. The cylindrical can 130 may be made of steel, stainless steel, aluminum, or an equivalent thereof, but the material is not limited herein.

The cap assembly 140 may include an approximately ring-shaped insulating gasket 141 coupled to the upper region of the cylindrical can 130, particularly, to the upper region of the electrode assembly 110 and the center pin 120, and a conductive safety vent 142 coupled to the insulating gasket 141. The positive electrode tab 115 may be connected to the safety vent 142. Alternatively, the negative electrode tab 114 may be connected to the safety vent 142. As widely known in the art, the safety vent 142 deforms or fractures, when the internal pressure of the can 130 rises, and breaks the circuit board 143

(described later) or evacuates gas to the exterior. A circuit board 143 is positioned on top of the safety vent 142 and is damaged or broken, when the safety vent 142 deforms, to interrupt the current. A Positive Temperature Coefficient (PTC) device 144 is positioned on top of the circuit board 143 and interrupts the current in the case of excessive current. A conductive positive (or negative) electrode cap 145 is positioned on top of the PTC device 144 to provide positive electrode voltage (or negative electrode voltage) to the exterior and is provided, with a number of through-holes 145a for easy gas evacuation. The safety vent 142, the circuit board 143, the PTC device 144, and the positive electrode cap 145 are positioned inside the insulating gasket 141 to prevent them from being directly short-circuited to the cylindrical can 130. The circuit board 143 has a wiring pattern 143a formed on the surface thereof, which is naturally cut off when the circuit board 143 is damaged or broken.

The cylindrical can 130 has a beading part 133 positioned on the lower portion of the cap assembly 140, while being recessed towards the interior, and a crimping part 134 formed on the upper portion of the cap assembly 140, while being bent towards the interior, in order to prevent the cap assembly 140 from escaping to the exterior. The beading and crimping parts 133 and 134 firmly fix and support the cap assembly 140 to the cylindrical can 130 and prevent the electrolyte (described later) from leaking out.

The cylindrical can 130 has an electrolyte (not shown) injected therein to enable lithium ions to move, which are created by electrochemical reactions from the negative and positive electrode plates 111 and 112 within the battery during charging/discharging. The electrolyte may be a non-aqueous organic electrolyte, which is a mixture of lithium salt and high-purity organic solvent. In addition, the electrolyte may be a polymer using a high-molecular electrolyte, but the type of the electrolyte is not limited herein.

As shown in FIGS. 1D and 1E, a functional center pin 120 according to one embodiment of the present invention includes a body 121 having a predetermined length and a closure member 123 for closing the upper and lower ends of the body 121.

The body 121 may approximately have the shape of a circular pipe having a predetermined length with open upper and lower ends. Instead of the circular pipe, the body 121 may have the shape of a triangular pipe, a square pipe, a polygonal pipe, or an elliptical pipe, but the shape of the body 121 is not limited herein. The length of the body 121 may be equal to, slightly larger than, or slightly smaller than that of the electrode assembly 110, but the length is not limited herein. The body 121 may be made of steel, stainless steel, aluminum, or an equivalent thereof, which has a strength high enough to prevent the electrode assembly 110 from deforming, but the material is not limited herein. The upper and lower ends of the body 121 are the most likely to deform and, in order to minimize the deformation, may have chamfers or tapers 122 formed thereon, respectively, wherein the diameter becomes smaller, but the shape is not limited herein.

The closure member 123 may be a film enclosing the entire body 121, including its upper and lower ends, approximately in the shape of an envelope around the body 121. The closure member 123 may be made of a material which melts or fractures at a predetermined temperature. More specifically, the closure member 123 melts or fractures, when the internal temperature of the battery is about 80-120° C. (in this case, the battery's surface temperature is about 30-60° C.), so that the upper and lower ends of the body 121 constituting the center pin 120 are open. According to this embodiment of the present invention, the upper and lower ends of the center pin 120 remain closed in the initial stage of overcharging, so that the void volume is substantially reduced and the safety vent 142 is quickly operated. When the internal temperature of the battery reaches 80-120° C., however, the battery is directly exposed to the danger of heating, leakage, smoking, explosion, and fire and the closed center pin 120 has no meaning. In other words, in one embodiment, the center pin 120 acts as a gas conduit in this state. In particular, gas formed by decomposition of cyclo hexyl benzene (CHB) and biphenyl (BP) included in the electrolyte may be concentrated at the safety vent 142 along the interior of the body 121 of the center pin 120, in terms of stability regarding prevention of the battery from heating, leaking, smoking, exploding, or catching fire.

The closure member 123 may be made of a conventional high-molecular resin, but the material is not limited in the present invention. More specifically, the closure member 123 may be made of any one chosen from polyethylene, epoxy, acetal, indium, and an equivalent thereof, but the material is not limited herein. Any material can be used as the closure member, as long as it melts or fractures when the internal temperature of the battery reaches 80-120° C. The closure member 123, in some embodiment, has a thickness of 1-200µm, and in other embodiments 25-75µm. If the thickness of the closure member 123 is below 1 µm, it may undesirably melt or fracture at a low temperature and, if the thickness of above 200µm, it may fail to melt or fracture at a desired temperature. However, the thickness may vary depending on the material and is not limited herein.

The melting temperature of the closure member 123 may be set differently based on the type, capacity, shape, size, and form of the battery. If stability seriously degrades even when the internal temperature of the battery is below 80° C., the closure member 123 can be set to melt or fracture below 80° C. If there is little problem with the stability even when the internal temperature of the battery is above 120° C., the closure member 123 can be set to melt or fracture above 120° C.

A gasification member 124 may be inserted into the body 121 to decompose at a predetermined voltage or higher and generate gas. The gasification member 124 usually decomposes and gasifies when the battery is overcharged, particularly, when the battery voltage is 4-4.5V or higher. More specifically, the gasification member 124 may be made of cyclo hexyl benzene (CHB), biphenyl (BP), or an equivalent thereof, which is added to the electrolyte, but the material is not limited in the present invention. When included in the electrolyte, the cyclo hexyl benzene (CHB) and biphenyl (BP) adversely shortens the battery life. However, the gasification member 124, which is positioned inside the body 121, does not normally react with the electrolyte and may be made of any material. In other words, any material capable of generating gas as much as possible can be used as the gasification member 124, because, once the safety vent 142 is operated, the battery can not be used any longer. This does not mean that the gasification member 124 is allowed to generate so much gas as to degrade the stability of the battery. In this regard, this embodiment of the present invention is advantageous in that, since the cyclo hexyl benzene (CHB) and biphenyl (BP) can be included in the gasification member 124 inside the body 121 of the center pin 120, no additive needs to be added to the electrolyte, including the cyclo hexyl benzene (CHB) and biphenyl (BP). This makes it possible to optimize the capacity and life of the battery.

For example, when the internal temperature of the battery reaches about 80-120° C. due to overcharging of the battery, the closure member 123 melts or fractures and the gasification member 124 is introduced into the battery. Particularly, the gasification member 124 is transferred to the electrolyte outside the center pin 120 or to the electrode assembly. The voltage in this state is about 4-4.5V or higher, which corresponds to the overcharging voltage, and the gasification member 124 quickly decomposes and generates a large amount of gas. The large amount of gas deforms or fractures the safety vent 142 more rapidly and breaks the circuit board 143 while being evacuated to the exterior via the positive electrode cap 145. In summary, the gasification member 124 avoids overcharging and substantially improves the thermal stability. After the gasification member 124 is completely removed from the center pin 120, the upper and lower ends of the center pin 120 are completely open and the center pin 120 can fully act as a gas conduit.

A non-flammable member 125 may be inserted into the body 121. The non-flammable member 125 may be mixed with the gasification member 124 to be inserted together or may solely fill the body 121. When the internal temperature of the battery reaches 80-120° C., as mentioned above, the closure member 123 melts or fractures so that the non-flammable member 125 can be transferred to outside of the center pin 120. This substantially decreases the possibility that the battery will catch fire. In spite of these processes, the outer appearance of the battery remains intact. The non-flammable member 125 may include at least one material chosen from a magnesium hydroxide-based material, an aluminum hydroxide-based material, a halogen-based material, an antimony trioxide-based material, a melamine-based material, a phosphate-based material, and an equivalent thereof, but the material is not limited in the present invention. In one embodiment, the non-flammable member 125 is made of an environment-friendly material which is not detrimental to human bodies.

The gasification member 124 and the non-flammable member 125 may be in a normal gas, liquid, or solid state, but the state is not limited in the present invention.

Figure 2A:
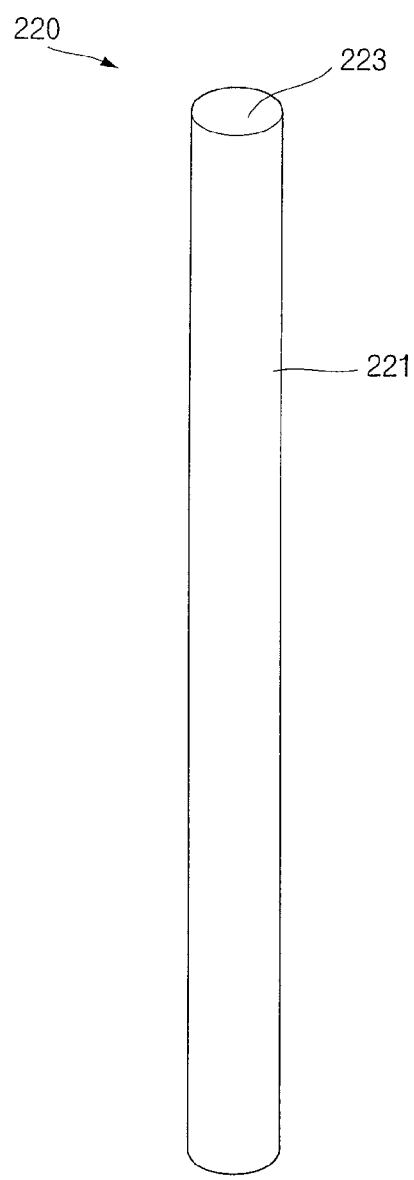
FIG. 2A is a perspective view magnifying another functional center pin of a cylindrical lithium ion secondary battery according to the present invention.
Figure 2B:
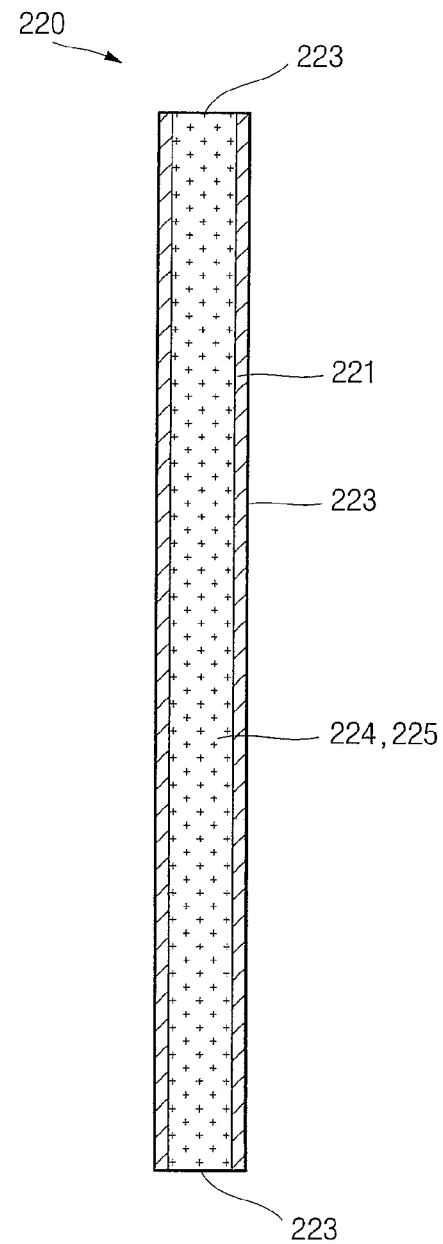
FIG. 2B is a sectional view magnifying another functional center pin of a cylindrical lithium ion secondary battery according to the present invention.

Referring to FIGS. 2A and 2B, a magnified perspective view and a sectional view showing another embodiment of a functional center pin of a cylindrical lithium ion secondary battery according to the present invention are illustrated, respectively.

The functional center pin 220 has a shape almost identical to that of the above-mentioned center pin 120 and the difference will now be described.

As shown, the functional center pin 220 does not have a separate chamfer or taper formed on the upper and lower ends of its body 221. The interior of the body 221 is filled with a gasification member 224 and/or a non-flammable member 225 and the entire surface of the body 221 is enclosed by a film-type closure member 223. The functional center pin 220, which has no chamfer or taper formed on the upper and lower ends thereof, is advantageous in that it can be manufactured with comparatively low cost.

Figure 3A:
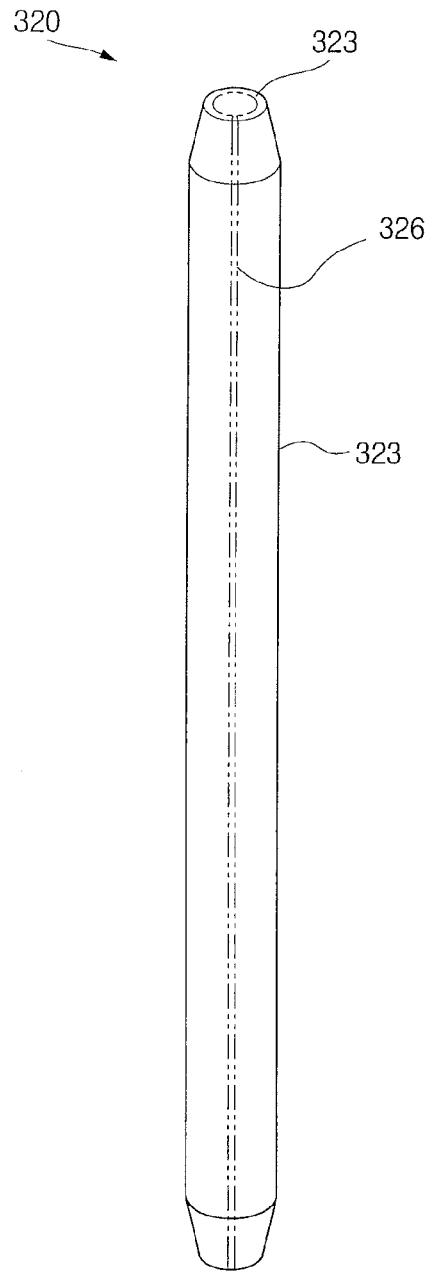
FIG. 3A is a perspective view magnifying another functional center pin of a cylindrical lithium ion secondary battery according to the present invention.
Figure 3B:
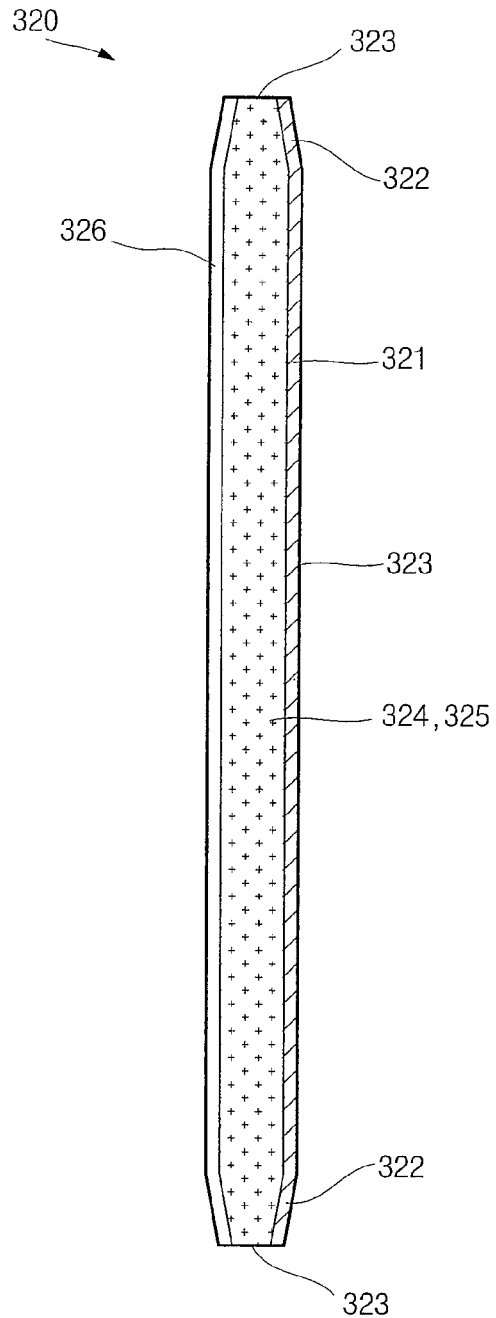
FIG. 3B is a sectional view magnifying another functional center pin of a cylindrical lithium ion secondary battery according to the present invention.

Referring to FIGS. 3A and 3B, a magnified perspective view and a sectional view showing another embodiment of a functional center pin of a cylindrical lithium ion secondary battery according to the present invention are illustrated, respectively.

The functional center pin 320 has a shape almost identical to that of the above-mentioned center pin 120 and the difference will now be described.

As shown, the functional center pin 320 has a penetrating slit 326 formed along the longitudinal direction of its body 320. The penetrating slit 326 may be recessed inwards a predetermined length lest the electrode assembly should be damaged when the center pin 320 deforms. The body 321 may have chamfers 322 formed on the upper and lower ends thereof, respectively. Alternatively, the body 321 may have no chamfer 322 formed thereon. The interior of the body 321 is filled with a gasification member 324 and/or a non-flammable member 325. The entire surface of the body 321 is enclosed by a film-type closure member 323. The upper and lower ends of the body 321, which are open, as well as the penetrating slit 326, are enclosed by the closure member 323. When the closure member 323 melts or fractures, the gasification member 324 and/or the non-flammable member 325 are introduced into the battery not only via the upper and lower ends of the body 321, but also via the penetrating slit 326.

Figure 4A:
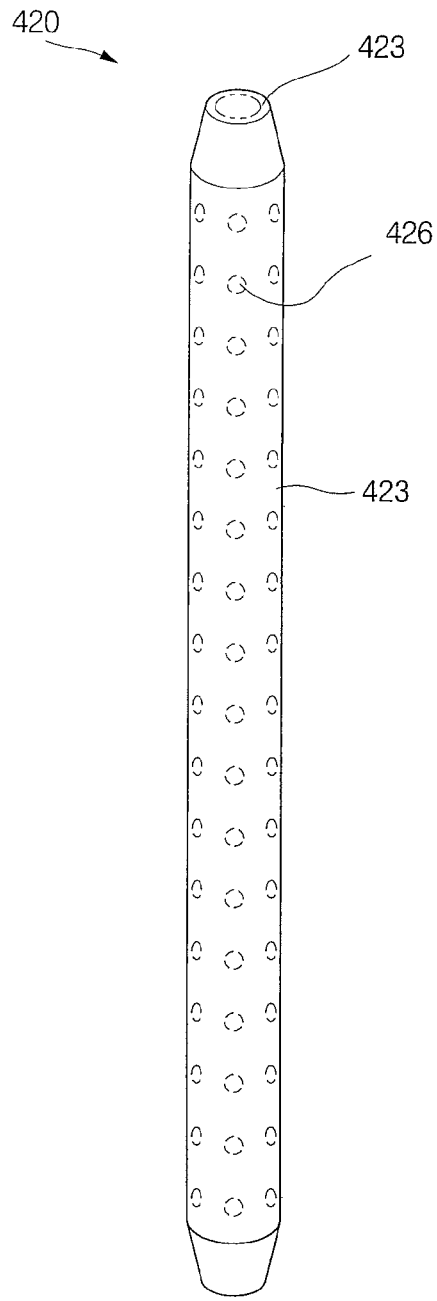
FIG. 4A is a perspective view magnifying another functional center pin of a cylindrical lithium ion secondary battery according to the present invention.
Figure 4B:
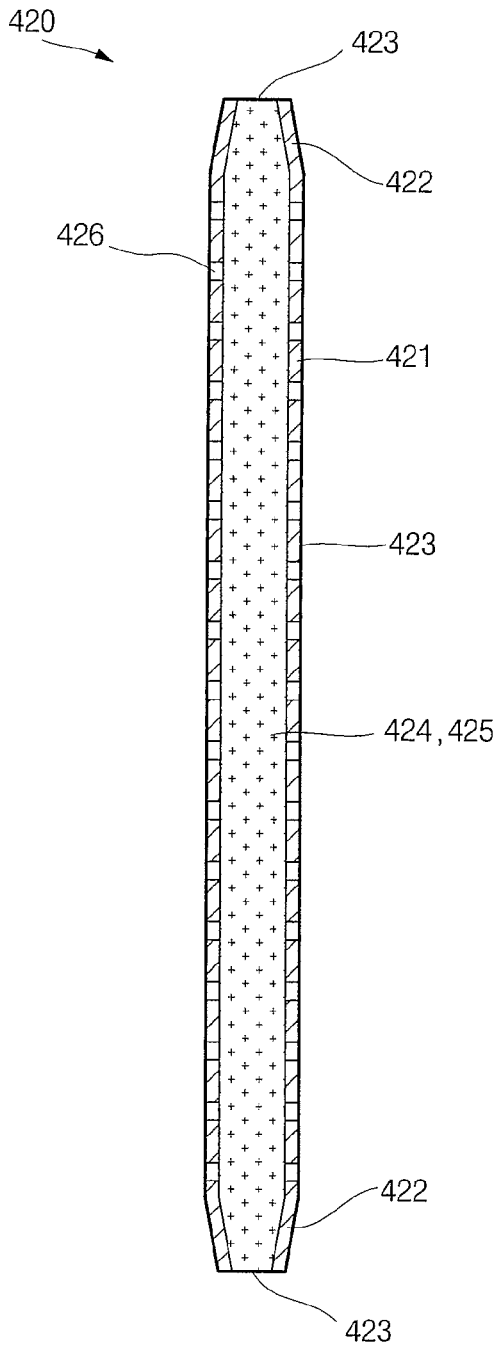
FIG. 4B is a sectional view magnifying another functional center pin of a cylindrical lithium ion secondary battery according to the present invention.

Referring to FIGS. 4A and 4B, a magnified perspective view and a sectional view showing another embodiment of a functional center pin of a cylindrical lithium ion secondary battery according to the present invention are illustrated, respectively.

The functional center pin 420 has a shape almost identical to that of the above-mentioned center pin 120 and the difference will now be described.

The functional center pin 420 has a number of through-holes 426 formed on its body 421. The body 421 may have chamfers 422 formed on the upper and lower ends thereof, respectively. Alternatively, the body 421 may have no chamfer formed thereon. The interior of the body 421 is filled with a gasification member 424 and/or a non-flammable member 425.

The entire surface of the body 421 is enclosed by a film-type closure member 423. The upper and lower ends of the body 421 and the through-holes 426 are enclosed by the closure member 423. When the closure member 423 melts or fractures, the gasification member 424 and/or the non-flammable member 425 are introduced into the battery not only via the upper and lower ends of the body 421, but also via the through-holes 426.

Figure 5A:
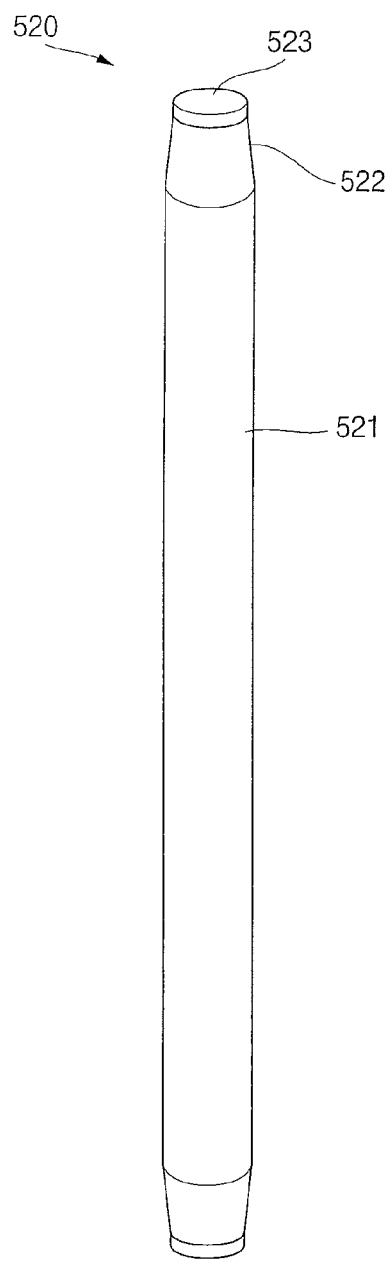
FIG. 5A is a perspective view magnifying another functional center pin of a cylindrical lithium ion secondary battery according to the present invention.
Figure 5B:
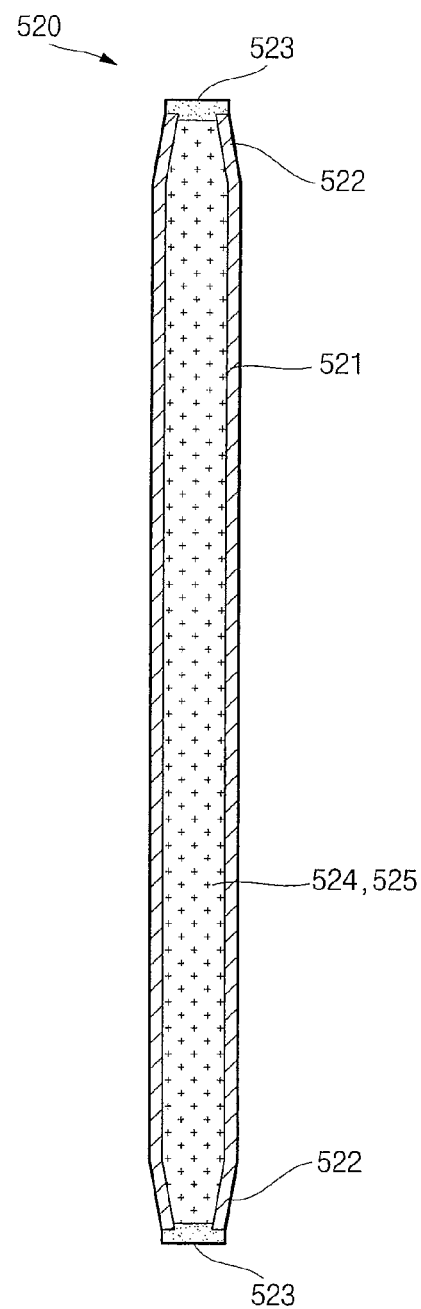
FIG. 5B is a sectional view magnifying another functional center pin of a cylindrical lithium ion secondary battery according to the present invention.

Referring to FIGS. 5A and 5B, a magnified perspective view and a sectional view showing another embodiment of a functional center pin of a cylindrical lithium ion secondary battery according to the present invention are illustrated, respectively.

The functional center pin 520 has a shape almost identical to that of the above-mentioned center pin 120 and the difference will now be described.

As shown, closure members 523 are configured as caps which cover the upper and lower ends of the body 521 of the center pin 520. Particularly, closure members 523 are formed in the shape of caps and are coupled to the upper and lower ends of the body 521, respectively. The closure members 523 may be made of a high-molecular resin which melts or fractures at a predetermined temperature (when the battery's internal temperature is 80-120° C.), for example, any one chosen from polyethylene, epoxy, acetal, indium, and an equivalent thereof, but the material is not limited herein. The body 521 has chamfers 522 formed on the upper and lower ends thereof, respectively, wherein the diameter becomes smaller. The body 521 may have a gasification member 524 and/or a non-flammable member 525 inserted and positioned therein, as mentioned above. When the internal temperature of the battery provided with the center pin 520 reaches 80-120° C., the closure members 523 melt or fracture so that the gasification member 524 and/or the non-flammable member 525 are introduced into the battery. As a result, the gasification member 524 and/or the non-flammable member 525 cause the safety vent to be quickly operated and stop the overcharging state. In addition, they suppress heating, leakage, smoking, fire, explosion, and further increase in temperature.

Figures 6A, 6B:
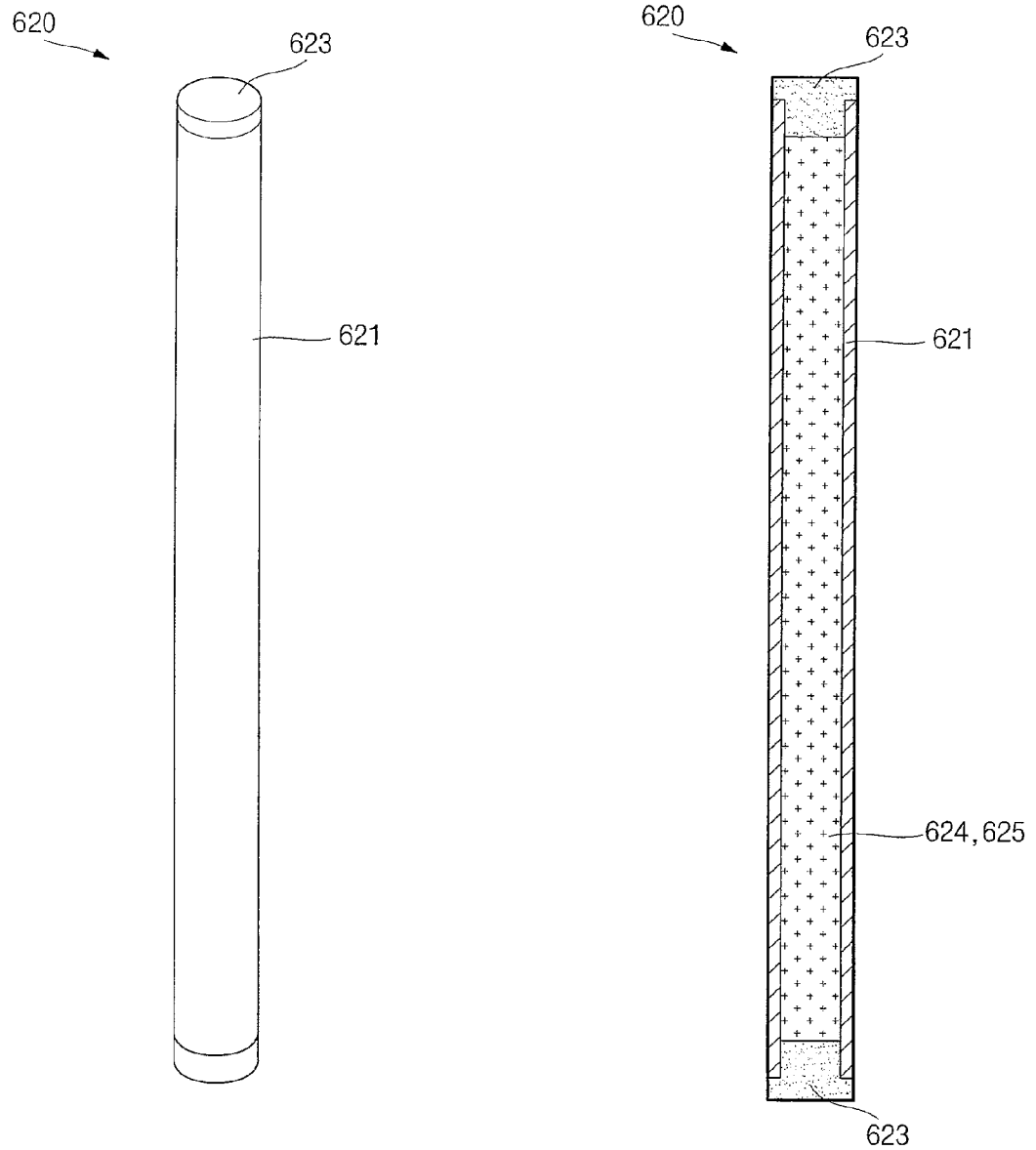
FIG. 6A is a perspective view magnifying another functional center pin of a cylindrical lithium ion secondary battery according to the present invention.
FIG. 6B is a sectional view magnifying another functional center pin of a cylindrical lithium ion secondary battery according to the present invention.

Referring to FIGS. 6A and 6B, a magnified perspective view and a sectional view showing another embodiment of a functional center pin of a cylindrical lithium ion secondary battery according to the present invention are illustrated, respectively.

The functional center pin 620 has a shape almost identical to that of the above-mentioned center pin 120 and the difference will now be described.

As shown, the functional center pin 620 has a body 621 shaped approximately as a cylindrical pipe. The body 621 has no chamfer formed on the upper and lower ends thereof. Instead, closure members 623 are coupled to the upper and lower ends of the body 621 as caps, respectively. The closure members 623 are made of a material which melts or fractures at a predetermined temperature. The interior of the body 621 is filled with a gasification member 624 and/or a non-flammable member 625. When the closure members 623 melt or fracture, the gasification member 624 and/or the non-flammable member 625 are introduced into the battery via the upper and lower ends of the body 621.

Figure 7A:
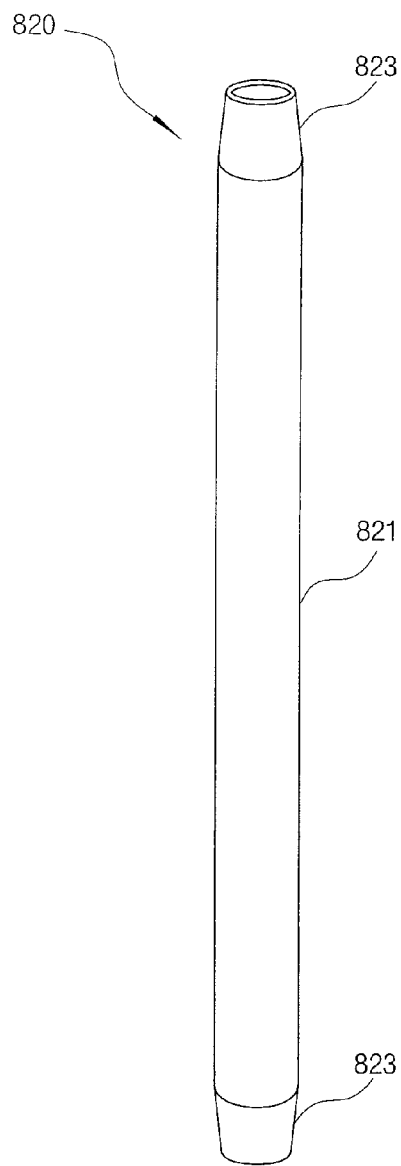
FIG. 7A is a perspective view magnifying another functional center pin of a cylindrical lithium ion secondary battery according to the present invention.
Figure 7B:
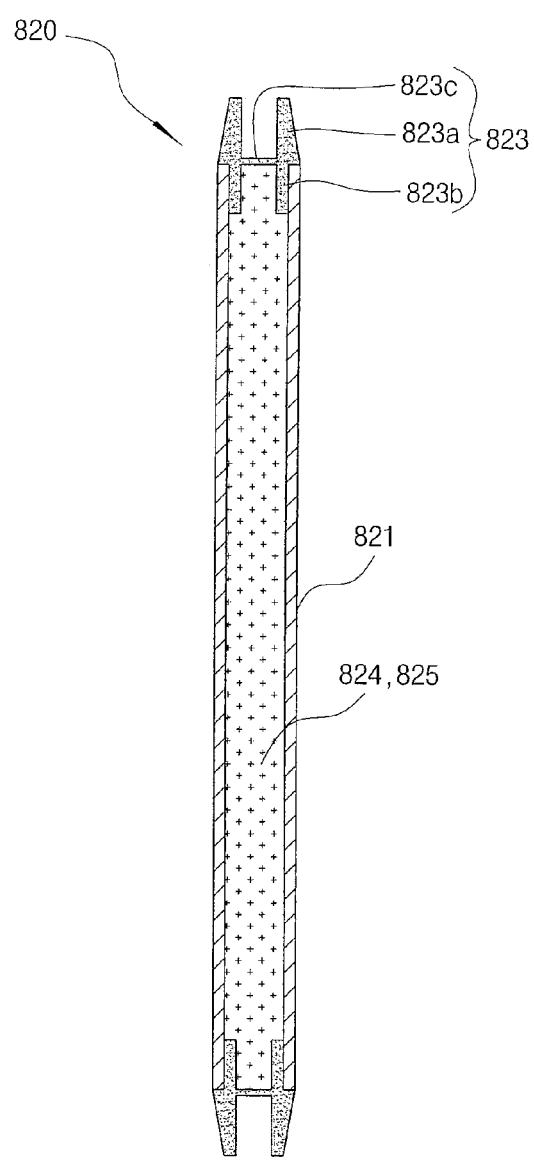
FIG. 7B is a sectional view magnifying another functional center pin of a cylindrical lithium ion secondary battery according to the present invention.

Referring to FIGS. 7A and 7B, a magnified perspective view and a sectional view showing another embodiment of a functional center pin of a cylindrical lithium ion secondary battery according to the present invention are illustrated, respectively.

The functional center pin 820 has a shape almost identical to that of the above-mentioned center pin 620 and the difference will now be described.

As shown, the functional center pin 820 has a body 821 shaped approximately as a cylindrical pipe. The body 821 has no chamfer formed on the upper and lower ends thereof. Instead, closure members 823 are coupled to the upper and lower ends of the body 821 as caps, respectively. Each closure member 823 includes a docking portion 823a coupled to the body 821, a taper portion 823b outwardly projecting by a predetermined length from the docking portion 823a, and a film 823c substantially blocking an opening to the body 821, the film formed between the docking portion 823a and the taper portion 823c. Here, the diameter of the taper portion 823b becomes gradually smaller at one end. The reason why the taper portion 823b is formed is to easily combine the center pin 820 to the electrode assembly, and to prevent damage of the electrode assembly during the combination thereof. The closure members 823 are made of a material which melts or fractures at a predetermined temperature. The interior of the body 821 is filled with a gasification member 824 and/or a non-flammable member 825. When the closure members 823 (the film 823c) melt or fracture, the gasification member 824 and/or the non-flammable member 825 are introduced into the battery via the upper and lower ends of the body 821.

Figure 8A:
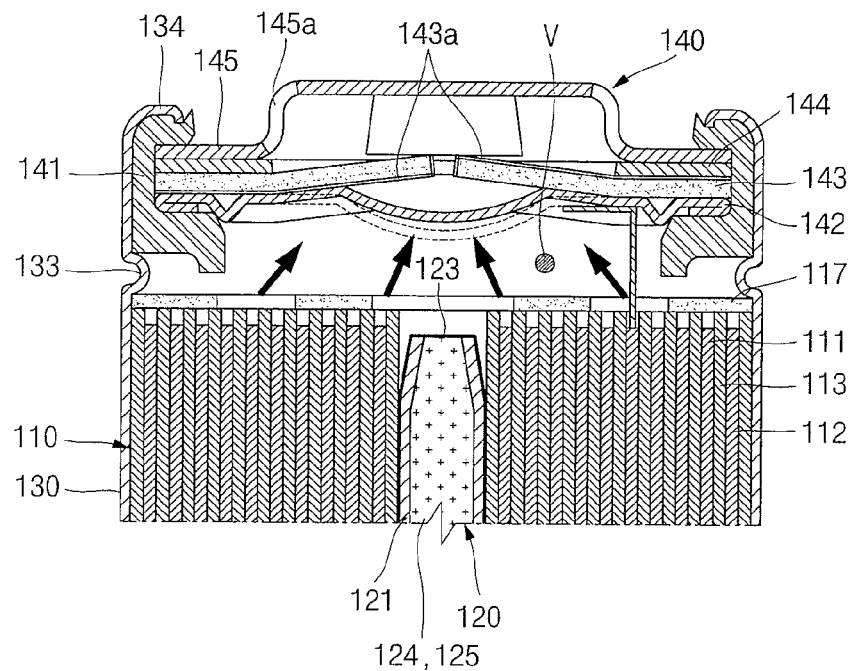
FIG. 8A is a diagrammatic view showing a cylindrical lithium ion secondary battery having a functional center pin according to the present invention, wherein the safety vent is operated at a low pressure due to decrease in void volume by the center pin.
Figure 8B:
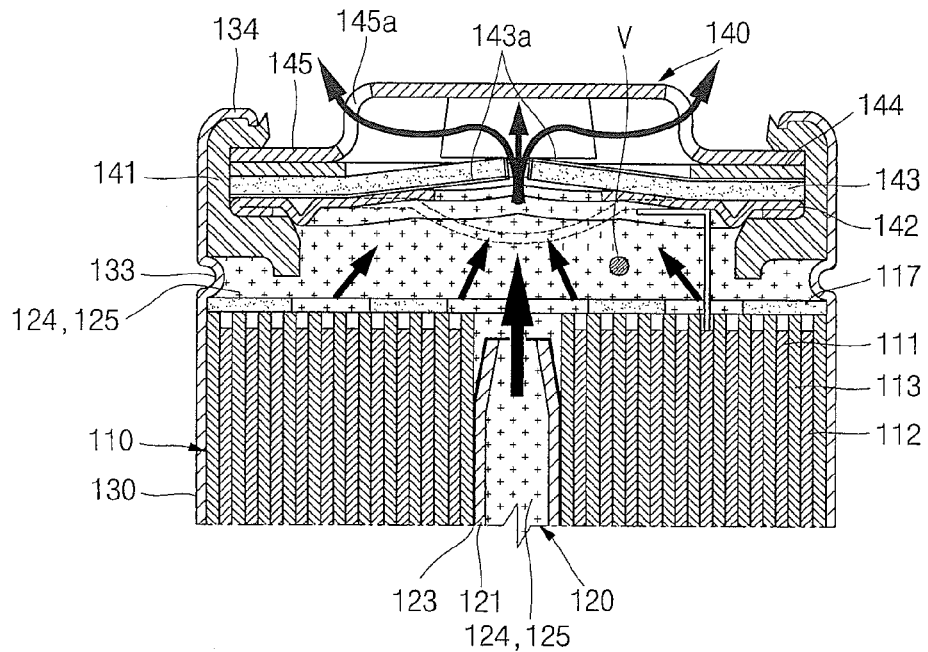
FIG. 8B is a diagrammatic view showing rapid operation of a safety vent due to melting or fracture of a closure member formed on a center pin.

Referring to FIG. 8A, a diagrammatic view showing a cylindrical lithium ion secondary battery having a functional center pin according to the present invention is illustrated, wherein the safety vent is operated at a low pressure due to decreasing void volume by the center pin. Referring to FIG. 8B, a diagrammatic view showing rapid operation of the safety vent due to melting or fracture of the closure member formed on the center pin is illustrated. In the drawings, arrows indicate the direction of gas (or direction in which pressure is applied) inside the battery.

As shown in FIG. 8A, when a low internal pressure occurs due to overcharging of the battery, the safety vent 142 is deformed outwards by the low pressure. Particularly, the internal gas pushes the safety vent 142 outwards. As the safety vent 142 deforms outwards, the circuit board 143 positioned on the safety vent 142 is broken and the wiring pattern 143a formed on the surface thereof is cut off accordingly. Then, the battery's overcharging and temperature increase stop.

The upper and lower ends (not shown) of the center pin 120 fitted into the electrode assembly 110 below the safety vent 142 are closed. More specifically, the upper and lower ends of the body 121 of the center pin 120 are completely closed by the closure member 123. Therefore, the void volume V inside the battery exists among the lower region of the safety vent 142, the center pin 120, and the upper region of the electrode assembly 110. When cyclo hexyl benzene (CHB) and/or biphenyl (BP) which have been added to the electrolyte decompose and generate gas in the case of overcharging, the gas fills the void volume which has become smaller and the pressure becomes larger compared with the prior art. As a result, larger pressure within the void volume further advances the operation time of the safety vent 142 and the current interruption time. It is obvious to those skilled in the art that, although such an operation occurs when the internal temperature of the battery is about 80-120° C. or less, the operation temperature may vary depending on the type and shape of the battery. As the void volume V is reduced, furthermore, a smaller amount of overcharging prevention agent (CHB, BP, etc.) can be added to the electrolyte. This further improves the capacity and life of the battery.

When the battery is overcharged and its internal temperature reaches 80-120° C. (when the battery's surface temperature is 30-60° C.) or higher as shown in FIG. 8B, the thermal state becomes unstable and the battery is very likely to smoke, explode, or catch fire. In a condition like this, the closure member 123, which has been closing the center pin 120, melts or fractures. In particular, the closure member 123 formed on the upper and lower ends of the body 121 of the center pin 120 melts or fractures at a temperature of 80-120° C. or higher. As the closure member 123 melts or fractures, the gasification member 124 and/or the non-flammable member 124, which have stayed inside the center pin 120, move towards the external electrolyte and the electrode assembly 110. The center pin 120 acts as a gas conduit and facilitates rapid movement of gas from inside the battery towards the safety vent 142, which then receives more stress.

The gasification member 124 naturally gasifies, because, by its nature, it decomposes and gasifies at 4-4.5V or higher (overcharging voltage). As a result, the safety vent 142 is pushed or deformed outwards with a stronger force. Due to the gasification member 124, as the safety vent 142 fractures, the internal gas may also escape to the exterior via the through-holes 145a of the positive and negative electrode caps 145. This prevents the battery from exploding. In addition, the circuit board 143 is substantially broken and its wiring pattern 143a is completely cut off. As a result, the charging process stops and the battery's thermal stability improves.

Furthermore, as the non-flammable member 125 is introduced into the battery, the battery is fundamentally prevented from smoking or catching fire. Particularly, the non-flammable member 125 is distributed in the electrolyte or the electrode assembly 110 and prevents them from smoking or catching fire.

Figure 9:
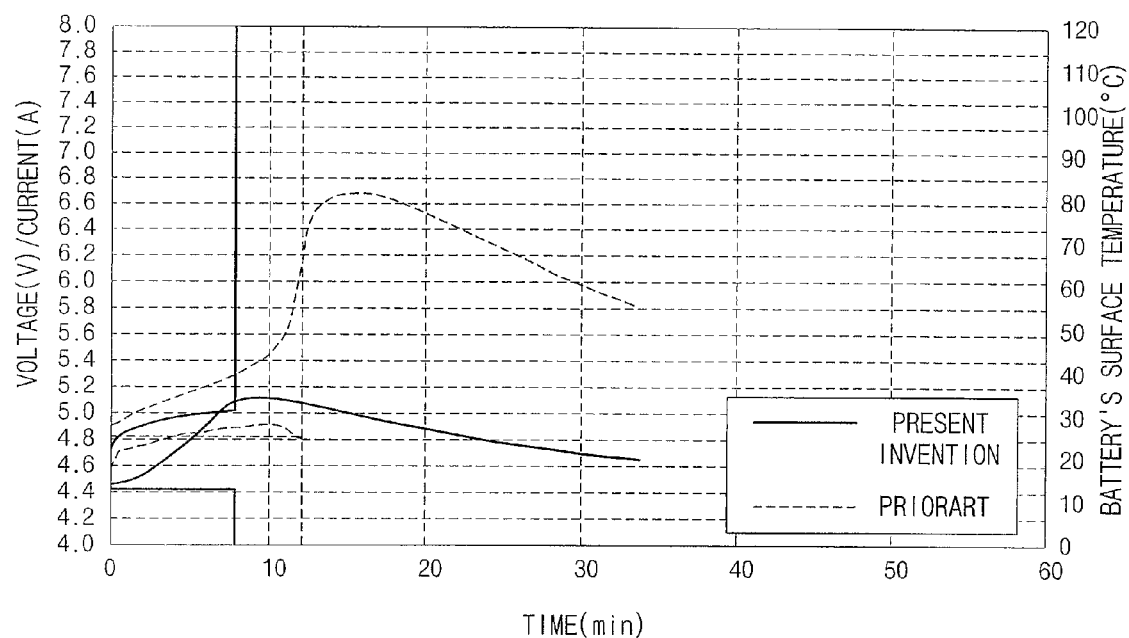
FIG. 9 is a graph showing the relationship among voltage/current, current interruption time, and battery's surface temperature in the case of overcharging for comparison between a cylindrical lithium ion secondary battery having a functional center pin according to the present invention and a cylindrical lithium ion secondary battery having a center pin according to the prior art.

Referring to FIG. 9, a graph showing the relationship among voltage/current, circuit board operation time, and battery surface temperature in the case of overcharging for comparison between a cylindrical lithium ion secondary battery having a functional center pin according to one embodiment of the present invention and a cylindrical lithium ion secondary battery having a center pin according to the prior art is illustrated.

As shown, the left Y-axis indicates voltage/current values, the right Y-axis indicates the battery surface temperature values, and the lower X-axis indicates the circuit board operation time (i.e., overcharging interruption time).

In the graph, broken lines show the tendency, during overcharging, of a cylindrical lithium ion secondary battery using a center pin according to the prior art, which does not consider the void volume, and solid lines show the tendency, during overcharging, of a cylindrical lithium ion secondary battery using an embodiment of the center pin according to the present invention, which considers the void volume.

It is clear from the graph that, in the case of the conventional battery, the current is interrupted after the overcharging state lasts about 12 minutes while the voltage is about 4.6V. This means that a dangerous condition of potential explosion or fire lasts as long as 12 minutes. The battery temperature (surface temperature) reaches 80° C. or higher, even when the current is interrupted. This corresponds to a very thermally unstable condition. The internal temperature of the battery is about 200° C. and, in this state, explosion or fire generally occurs.

In the case of the embodiment of the inventive battery, in contrast, the current is interrupted after the overcharging state lasts about 8 minutes while the voltage is 4.6V. This means that the time is shortened by about 4 minutes. In addition, the battery temperature (surface temperature) remains below about 40° C. This corresponds to a very thermally stable condition. The internal temperature of the battery is about 80-120° C. and there is little danger of explosion or fire.

Figure 10A:
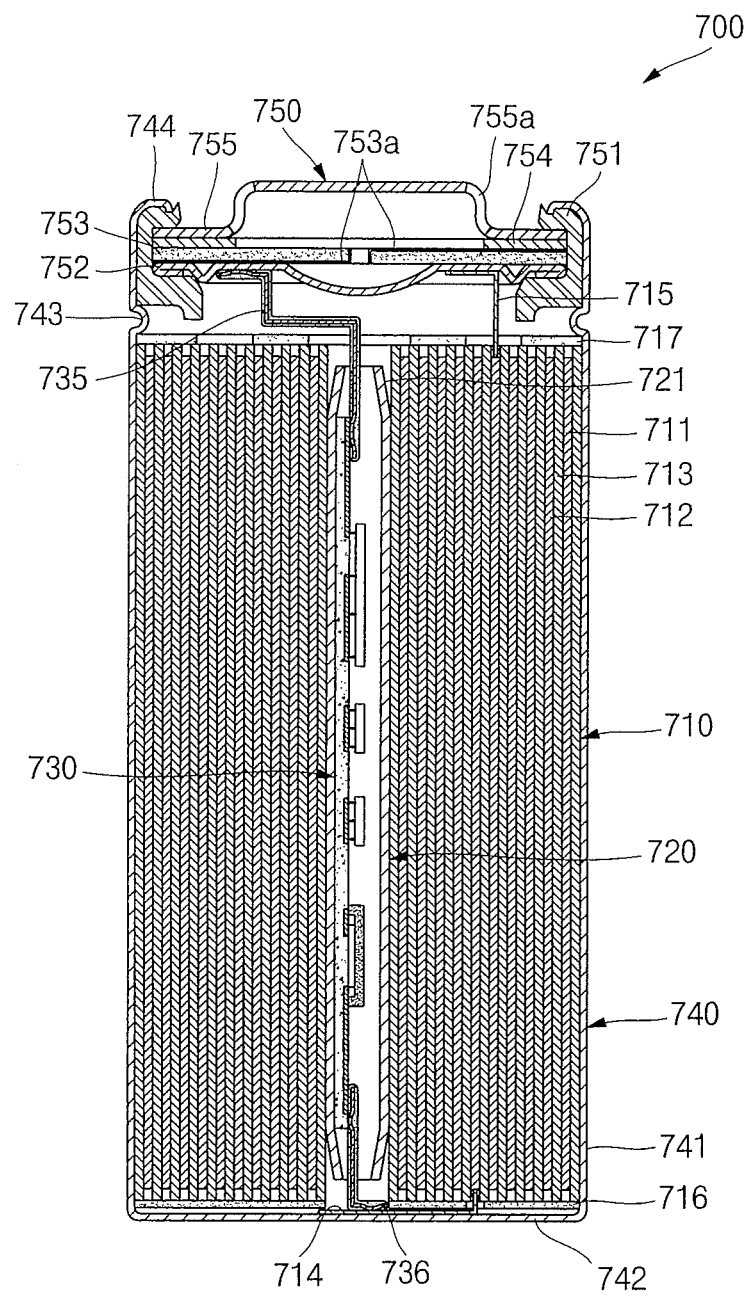
FIG. 10A is a sectional view showing a cylindrical lithium ion secondary battery according to another embodiment of the present invention.
Figure 10B:
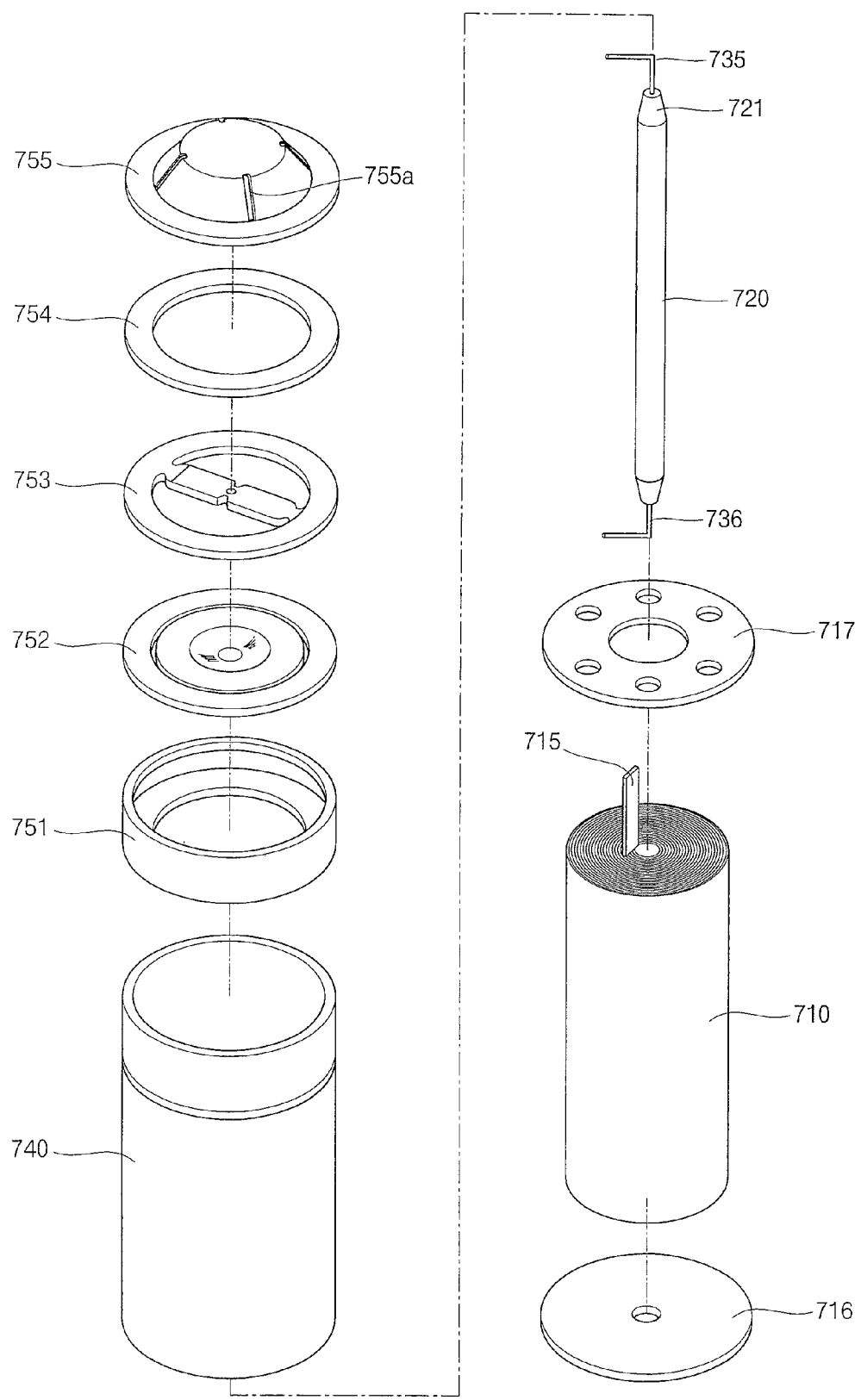
FIG. 10B is an exploded perspective view showing a cylindrical lithium ion secondary battery according to another embodiment of the present invention.
Figure 11:
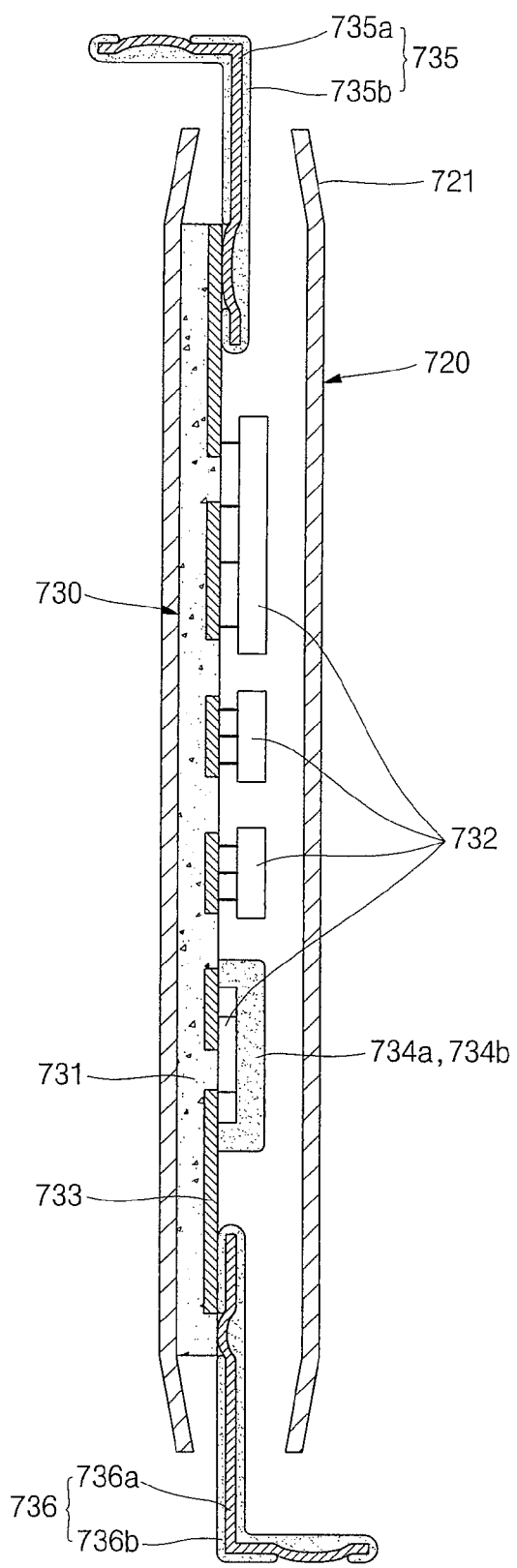
FIG. 11 is a sectional view showing a center pin, which contains a circuit member, of a cylindrical lithium ion secondary battery according to the present invention.

Referring to FIGS. 10A, 10B, and 11 a sectional view and an exploded perspective view showing a cylindrical lithium ion secondary battery according to another embodiment of the present invention are illustrated, respectively.

As shown, the cylindrical lithium ion secondary battery 700 according to this embodiment of the present invention includes an electrode assembly 710, a center pin 720 coupled to the electrode assembly 710, a circuit member 730 contained in the center pin 720 to generate a small degree of short circuit in the case of overcharging, a can 740 for receiving the center pin 720 containing the electrode assembly 710 and the circuit member 730, and a cap assembly 750 for covering the top of the can 740.

The electrode assembly 710 includes a negative electrode plate 711 coated with a negative electrode active material (for example, graphite), a positive electrode plate 712 coated with a positive electrode active material (for example, lithium cobalt oxide ($LiCoO_2$)), and a separator 713 positioned between the negative and positive electrode plates 711 and 712 to avoid a short circuit and allow only lithium ions to move. The negative and positive electrode plates 711 and 712 and the separator 713 are wound approximately into a cylinder and are received in the cylindrical can 740. The negative electrode plate 711 may be made of copper (Cu) foil, the positive electrode plate 712 may be made of aluminum (Al) foil, and the separator 713 may be made of polyethylene (PE) or polypropylene (PP), but the material is not limited in the present invention. The negative electrode plate 711 may have a negative electrode tab 714 welded thereto, while protruding downwards a predetermined length, and the positive electrode plate 712 may have a positive electrode tab 715 welded thereto, while protruding upwards a predetermined length, or vice versa. The negative electrode tab 714 may be made of a nickel (Ni) material and the positive electrode tab 715 may be made of an aluminum (Al) material, but the material is not limited in the present invention.

The center pin 720 is coupled approximately to the center of the electrode assembly 710 and prevents it from deforming during charging/discharging of the battery. The center pin 720 may have tapers 721 formed on the upper and lower ends thereof, respectively, so that the center pin 720 can easily fit into the electrode assembly 710. Alternatively, the tapers 721 may be omitted to reduce the cost.

The circuit member 730 is positioned inside the center pin 720. The circuit member 730 includes a circuit board 731 having a number of electronic components 732 mounted thereon. The circuit board 731 has a number of wiring patterns 733 formed thereon, on which the electronic components 732 are mounted. The wiring patterns 733 are electrically connected to the cap assembly and the can (described later) via first and second conductive tabs 735 and 736. The external shape and electrical interconnection of the circuit member 730 will be described later in more detail.

The can 740 approximately has the shape of a cylinder. In particular, the can 740 includes a cylindrical surface 741 having a predetermined diameter and an approximately disk-shaped bottom surface 742 formed on the lower portion of the cylindrical surface 741. The top of the can 740 is open so that the center pin 720, to which the electrode assembly 710 and the circuit member 730 are coupled, can be directly inserted downwards into the can 740 via the open top. The negative electrode tab 714 of the electrode assembly 710 may be welded to the bottom surface 742 of the cylindrical can 740, which then acts as the negative electrode. Alternatively, the positive electrode tab 715 may be welded to the bottom surface 742 of the cylindrical can 740, which then acts as the positive electrode. The second conductive tab 736 of the circuit member 730 may be connected to the bottom surface 742 or the negative electrode tab 715. The electrode assembly 710 may have lower and upper insulation plates 716 and 717 positioned on the lower and upper surfaces thereof, respectively, to avoid any unnecessary short circuit between the electrode assembly 710 and the cylindrical can 740. The cylindrical can 740 may be made of steel, stainless steel, aluminum, or an equivalent thereof, but the material is not limited herein.

The cap assembly 7500 may include an approximately ring-shaped insulating gasket 751 coupled to the upper region of the cylindrical can 740, particularly, to the upper region of the electrode assembly 740 and the center pin 720, and a conductive safety vent 752 coupled to the insulating gasket 751 while being connected to the positive electrode tab 715. The first conductive tab 735 of the circuit member 730 may be connected to the conductive safety vent 752. As widely known in the art, the safety vent 752 deforms or fractures, when the internal pressure of the can 740 rises, and breaks the circuit board 753 (described later) or evacuates gas to the exterior. A circuit board 753 is positioned on top of the safety vent 752 and is damaged or broken, when the safety vent 752 deforms, to interrupt the current. A PTC device 754 is positioned on top of the circuit board 753 and interrupts any excessive current. A conductive positive (or negative) electrode cap 755 is positioned on top of the PTC device 754 to provide positive electrode voltage (or negative electrode voltage) to the exterior and is provided with a number of through-holes 755a for easy gas evacuation. The safety vent 752, the circuit board 753, the PTC device 754, and the positive electrode cap 755 are positioned inside the insulating gasket 751 to prevent them from being directly short-circuited to the cylindrical can 740. The circuit board 753 has a wiring pattern 753a formed on the surface thereof, which is naturally cut off when the circuit board 753 is damaged or broken.

The cylindrical can 740 has a beading part 743 positioned on the lower portion of the cap assembly 750, while being recessed towards the interior, and a crimping part 744 formed on the upper portion of the cap assembly 750, while being bent towards the interior, in order to prevent the cap assembly 750 from escaping to the exterior. The beading and crimping parts 743 and 744 firmly fix and support the cap assembly 750 to the cylindrical can 740 and prevent the electrolyte (described later) from leaking out.

The cylindrical can 740 has an electrolyte (not shown) injected therein to enable lithium ions to move, which are created by electrochemical reaction from the negative and positive electrode plates 711 and 712 within the battery during charging/discharging. The electrolyte may be a non-aqueous organic electrolyte, which is a mixture of lithium salt and high-purity organic solvent. In addition, the electrolyte may be a polymer using a high-molecular electrolyte, but the type of the electrolyte is not limited herein.

Referring to FIG. 11, a sectional view showing a center pin, which contains a circuit member, of a cylindrical lithium ion secondary battery according to an embodiment of the present invention is illustrated.

As shown in FIGS. 10A, 10B, and 11, the circuit member 730 includes a circuit board 731 inserted into the center pin 720. The circuit board 731 has a number of wiring patterns 733 formed on the surface thereof, on which a number of electronic components 732 are mounted to perform various functions. Some electronic components 732 are enclosed by a gasification member 734a and/or a non-flammable member 734b. The operation of the gasification member 734a and/or the non-flammable member 734b will be described later in more detail. An end of the first conductive tab 735 is electrically connected to a specific wiring pattern 733 of the circuit board 731. The first conductive tab 735 includes a wiring 735a and an insulation film 735b enclosing the wiring 735a. A region of the wiring 735a is exposed to the exterior via the insulation film 735b for electrical connection. The other end of the wiring 735a of the first conductive tab 735 may be connected to a safety vent 752, which is a component of the cap assembly 750. An end of the second conductive tab 736 is electrically connected to another specific wiring pattern 733 of the circuit board 731. The second conductive tab 736 may include a wiring 736a and an insulation film 736b enclosing the wiring 736a. A region of the wiring 736a is exposed to the exterior via the insulation film 736b for electrical connection. The other end of the wiring 736a of the second conductive tab 736 may be connected to the bottom surface 742 of the cylindrical can 740 or the negative electrode tab 714. The first and second conductive tabs 735 and 736 may include only conductive wirings without any insulation film. Any one of the wirings of the first and second conductive tabs 735 and 736 can be prevented from being short-circuited to the center pin 720 to avoid an internal short circuit during normal charging/discharging.

Figure 12:
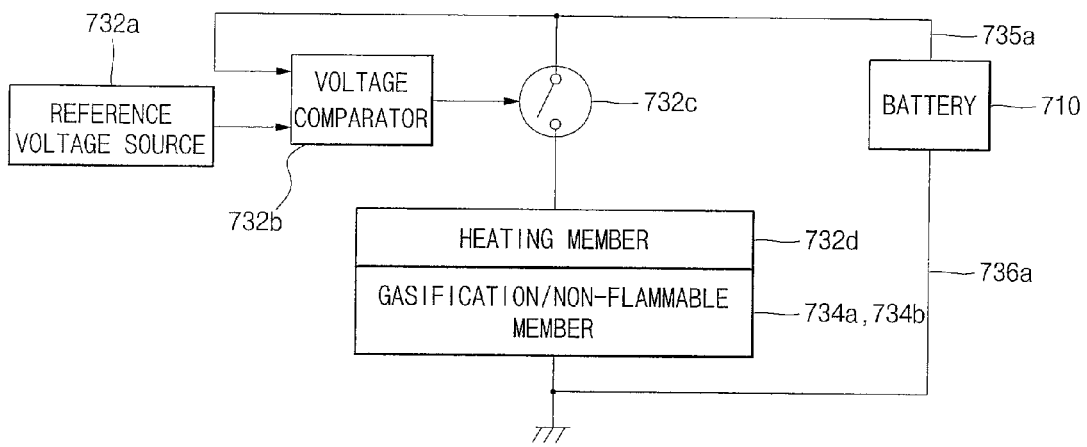
FIG. 12 is a block diagram showing an example of a circuit member which can be contained in a center pin of a cylindrical lithium ion secondary battery according to the present invention.

Referring to FIG. 12, a block diagram showing an example of an embodiment of a circuit member which can be contained in a center pin of a cylindrical lithium ion secondary battery according to the present invention is illustrated.

As shown, the circuit member 730 may include a reference voltage source 732a, a voltage comparator 732b, a short-circuit switch 732c, a heating member 732d, a gasification member 734a, and/or a non-flammable member 734b. As used herein, the battery 710 actually refers to a chargeable/rechargeable electrode assembly, however, which will hereinafter be simply referred to as a battery for convenience of description. Reference numerals 732a, 732b, 732c, and 732d refer to electronic components 732 as mentioned above.

The reference voltage source 732a inputs a reference voltage to a terminal of the voltage comparator 732b. The reference voltage may correspond to the overcharging voltage of the battery. More specifically, although the reference voltage may vary depending on the battery type, any value chosen from a range of about 4-5V may be inputted to a terminal of the voltage comparator 732b.

The reference voltage is inputted to a terminal of the voltage comparator 732b from the reference voltage source 732a, as mentioned above, and the voltage of the battery 710 is inputted to the other terminal thereof. The voltage comparator 723b outputs a short-circuit signal when the inputted battery voltage is larger than the reference voltage. For example, when the reference voltage is 4V, the voltage comparator 732b outputs a short-circuit signal without any delay if the battery voltage is 4V or higher. An operational (OP) amplifier is generally used as the voltage comparator 732b and, when the battery voltage is equal to or higher than the reference voltage, the power supply voltage is instantly outputted from the OP amplifier. The OP amplifier is just given as an example of the voltage comparator 732b and does not limit the present invention. Any device and circuit can be used as long as they can output a predetermined voltage when the battery voltage is larger than the reference voltage.

The short-circuit switch 732c is connected in parallel to the battery 710 and is toggled on/off by the voltage comparator 732b. When the battery voltage is less than the overcharging voltage, the short-circuit switch 732 remains toggled off and, when the battery voltage is equal to or larger than the overcharging voltage, the voltage comparator 732b is toggled on by the output signal. The battery 710 is short-circuited as the short-circuit switch 732c is toggled on, which then consumes a predetermined amount of electrical power.

The heating member 732d is positioned between the short-circuit switch 732c and the battery 710. When the short-circuit switch 732c is toggled on, the heating member 732d is supplied with electric power from the battery 710 and generates heat up to a predetermined temperature. The heating member 732d locally generates heat inside the center pin and does not abruptly increase the entire temperature of the cylindrical lithium ion secondary battery.

The heating member 732d is enclosed by the gasification member 734a and/or the non-flammable member 734b. The gasification member 734a and the non-flammable member 734b decompose and gasify as the heating member 732d generates heat. After gasifying, the gasification member 734a and the non-flammable member 734b are rapidly evacuated to the exterior of the center pin. This quickly increases the pressure inside the can and suppresses fire.

The gasification member 734a may be made of cyclo hexyl benzene (CHB), biphenyl (BP), or an equivalent thereof, which gasifies at a predetermined voltage more easily, but the material is not limited in the present invention. The non-flammable member 734b may be made of a magnesium hydroxide-based material, an aluminum hydroxide-based material, a halogen-based material, an antimony trioxide-based material, a melamine-based material, a phosphate-based material, or an equivalent thereof, but the material is not limited in the present invention. The heating member 732d may abruptly increase the temperature after the gasification member 734a and the non-flammable member 734b completely gasify. For example, the heating member 732d may increase the temperature up to about 200-300° C. Although the current interruption device of the battery is operated and the overcharging condition stops at such an elevated temperature, the heating member may still raise the temperature of the battery and is advantageously cut off automatically. In one embodiment, the heating member 734d is made of a fuse which is naturally cut off at 200-300° C. It is obvious to those skilled in the art that, even before the heating member 732d raises the temperature up to 200-300° C., the overcharging condition of the battery may stop or the battery may be completely discharged.

Figure 13:
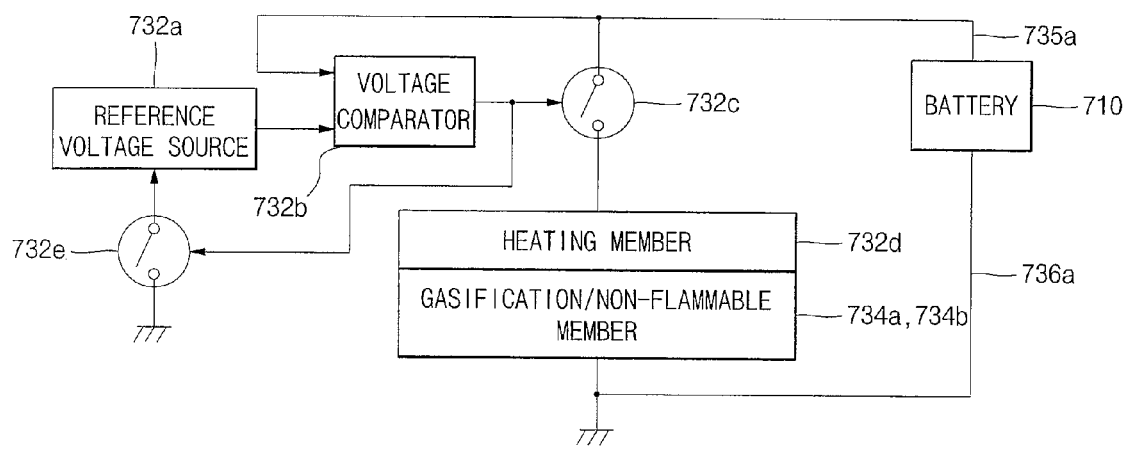
FIG. 13 is a block diagram showing another example of a circuit member which can be contained in a center pin of a cylindrical lithium ion secondary battery according to the present invention.

Referring to FIG. 13, a block diagram showing another example of an embodiment of a circuit member which can be contained in a center pin of a cylindrical lithium ion secondary battery according to the present invention is illustrated.

In the case of the circuit member 730 shown in FIG. 12, since the electrical power of the battery 710 is consumed as the short-circuit switch 732c is operated, the battery voltage may drop below the reference voltage provided by the reference voltage source 732a. As a result, the voltage comparator 732b has room to stop the output of signals which toggle the short-circuit switch 732c on. When the short-circuit switch 732c is toggled off, the heating member 732d stops functioning and the gasification member 734a and/or the non-flammable member 734b do not decompose any longer. In general, once the battery is overcharged, its stability and reliability degrade considerably. The battery can hardly be reused and is usually disposed of. The overcharged battery may be completely discharged to avoid any dangerous situation when disposing of it.

In the case of the circuit member 730 shown in FIG. 13, once the short-circuit switch 732c is toggled on, a ground switch 732e drops the reference voltage, which is provided by the reference voltage source 732a, to 0V. Particularly, the ground switch 732e is connected between the reference voltage source 732a and the ground and is controlled by signals outputted from the output terminal of the voltage comparator 732b. For example, when a reference voltage of 4V is inputted to the voltage comparator 732b, the voltage comparator 732b outputs a predetermined voltage, if the battery voltage reaches 4V, to operate the short-circuit switch 732c. The ground switch 732e is toggled on together with it and the reference voltage provided by the reference voltage source 732a becomes 0V. Then, the battery is continuously discharged until 0V.

Figure 14:
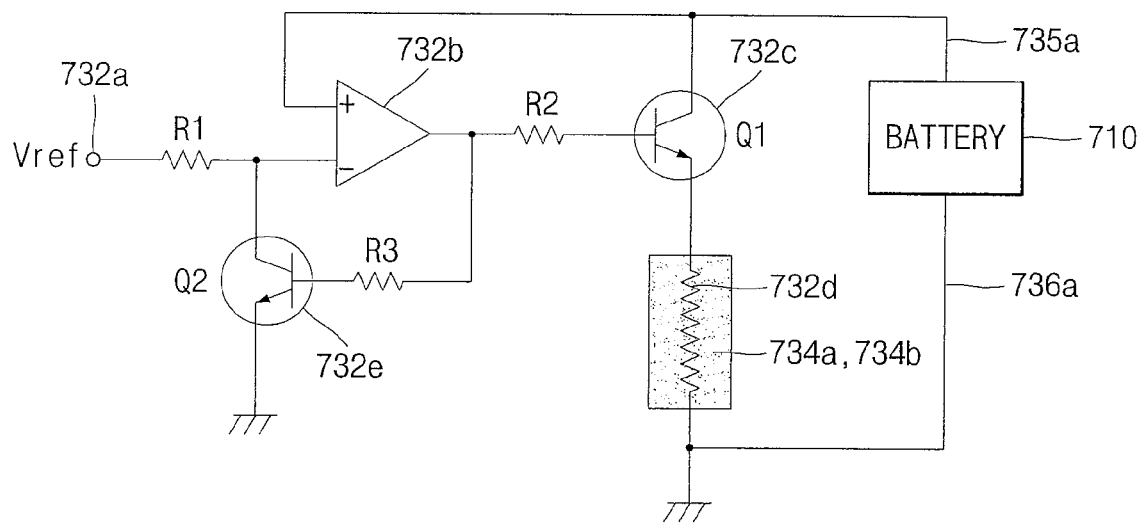
FIG. 14 is a block diagram showing another example of a circuit member which can be contained in a center pin of a cylindrical lithium ion secondary battery according to the present invention.

Referring to FIG. 14, a block diagram showing another example of an embodiment of a circuit member which can be contained in a center pin of a cylindrical lithium ion secondary battery according to the present invention is illustrated.

As shown, the reference voltage source 732a may provide a reference voltage of about 4-5V and may be connected to a terminal of the voltage comparator 732b via a resistor R1.

The voltage comparator 732b may be a conventional OP amplifier with the inverting terminal (−) connected to the reference voltage source 732a and the non-inverting terminal (+) connected to a terminal of the battery 710, or vice versa. The member for connecting the non-inverting terminal (+) of the voltage comparator 732b to the battery 710 may be the first conductive tab 735.

The short-circuit switch 732c may be a conventional transistor Q1 with the collector and the emitter connected in parallel to the battery and the base connected to the output terminal of the voltage comparator 732b via a resistor R2. Although a conventional bipolar transistor having a collector, an emitter, and a base has been given as an example of the transistor, a field-effect transistor having a drain, a source, and a gate may also be used.

The heating member 732d is connected between the ground and the emitter of the short-circuit switch 732c, particularly the transistor Q1. The ground and the battery 710 are connected to each other by a second conductive tab 736. The heating member 732d may be made of a conventional fuse, a coil, or an equivalent thereof, but the material is not limited in the present invention.

The heating member 732d may be enclosed by the gasification member 734a and/or the non-flammable member 734b, as mentioned above. The gasification member 734a and the non-flammable member 734b are in a solid state during a normal condition and enclose the heating member 732d. However, they are supposed to gasify when the short-circuit switch 732c is operated and the heating member 732d generates heat. For example, the gasification member 734a may be made of cyclo hexyl benzene (CHB), biphenyl (BP), or an equivalent thereof, but the material is not limited in the present invention. The non-flammable member 734b may be made of magnesium hydroxide-based material, an aluminum hydroxide-based material, a halogen-based material, an antimony trioxide-based material, a melamine-based material, a phosphate-based material, or an equivalent thereof, but the material is not limited in the present invention. The heating member 732d may abruptly increase the temperature after the gasification member 734a and the non-flammable member 734b gasify. For example, the heating member 732d may increase the temperature up to about 200-300° C. Although the current interruption device of the battery is operated and the overcharging condition stops at such an elevated temperature, the heating member may still raise the temperature of the battery and is advantageously cut off automatically. The heating member 732d may be made of a fuse which is naturally cut off at 200-300° C., but the material is not limited in the present invention.

Another ground switch 732e may be connected between the reference voltage source 732a and the ground. For example, the ground switch 732e may be a conventional transistor Q2 with the collector connected to the reference voltage source 732a, the emitter connected to the ground, and the base connected to the output terminal of the voltage comparator 732b via a resistor R3. Although a conventional bipolar transistor having a collector, an emitter, and a base has been given as an example of the ground switch 732, particularly the transistor Q2, a field-effect transistor having a drain, a source, and a gate may also be used. For example, when a reference voltage of 4V is inputted to the voltage comparator 732b and the battery voltage becomes 4V or higher, the voltage comparator 732b outputs a predetermined voltage to operate the short-circuit switch 732c. Then, the ground switch 732e is toggled on together and the reference voltage provided by the reference voltage source 732a becomes 0V. As a result, the battery 71 can be continuously discharged until 0V.

As mentioned above, the cylindrical lithium ion secondary battery having a functional center pin according to various embodiments of the present invention is advantageous in that, since the upper and lower ends of the center pin are closed, the void volume (or dead volume) which delays the operation time of the safety vent (or circuit board) is remarkably reduced. This is because the void volume is limited to the region between the electrode assembly, the center pin, and the cap assembly. As a result, the internal pressure is quickly concentrated in the case of overcharging of the battery and operates the safety vent. Then, the current interruption time is advanced and the overcharging stops rapidly.

When the battery temperature reaches a predetermined temperature or higher, the gasification member inside the center pin is evacuated. The gasification member quickly decomposes and gasifies at a predetermined voltage or higher. This further advances the operation time of the safety vent. In addition, the battery temperature does not rise any longer and the thermal stability of the battery improves.

When the battery temperature reaches a predetermined temperature or higher, the non-flammable member inside the center pin is evacuated to the exterior and fundamentally prevents the battery from smoking or catching fire.

In other words, the cylindrical lithium ion secondary battery according to the above-described embodiments of the present invention has a reduced void volume inside the battery to remarkably advance the operation time of the safety vent. The inventive battery also has a gasification member and/or a non-flammable member formed in the center pin to fundamentally prevent the battery from being overcharged, smoking, exploding, or catching fire.

When the charging voltage reaches a predetermined overcharging voltage, a small degree of short circuit is intentionally generated inside the center pin to consume the overcharging voltage. This prevents the battery from exploding due to overcharging and improves the stability of the battery.

When the charging voltage reaches a predetermined overcharging voltage, a large amount of gas is quickly generated to operate the safety vent without any delay. This prevents the battery from exploding due to overcharging and improves the stability of the battery.

When the charging voltage reaches a predetermined overcharging voltage, a large amount of non-flammable material is quickly evacuated to the exterior of the center pin. This prevents the battery from catching fire due to overcharging and improves the stability of the battery.

In summary, the cylindrical lithium ion secondary battery having a center pin containing an anti-overcharging circuit according to various embodiments of the present invention uses an anti-overcharging means which can be accurately and quickly realized at a predetermined overcharging voltage, instead of a conventional means realized in an electrochemical or chemical process, to substantially improve the safety and reliability of the battery.

Although various embodiments of the present invention have been described for illustrative purposes, those skilled in the art will appreciate that various modifications, additions and substitutions are possible, without departing from the scope and spirit of the invention as disclosed in the accompanying claims and their equivalents.

What is claimed is:

1. A cylindrical lithium ion secondary battery comprising:
    an electrode assembly;
    a center pin positioned within the electrode assembly;
    a circuit member contained in the center pin and adapted to be short-circuited when a charging voltage is equal to or larger than a reference voltage, the circuit member comprising:
        a reference voltage source for providing the reference voltage;
        a voltage comparator adapted to receive the reference voltage from the reference voltage source via a terminal, to receive a battery voltage via another terminal, and to output a short-circuit signal when the battery voltage is larger than the reference voltage; and
        a short-circuit switch connected in parallel to the battery and adapted to be toggled to an on setting by the short-circuit signal from the voltage comparator and to cause the battery to be short-circuited, the short-circuit switch being a transistor with a collector and an emitter connected in parallel to the battery, and a base connected to an output terminal of the voltage comparator;
    a heating member connected between the battery and the emitter of the transistor, the heating member having a gasification member mounted thereon, which gasifies at a predetermined temperature and increases an internal pressure of the battery;
    a can receiving the electrode assembly and the center pin, which contains the circuit member; and
    a cap assembly coupled to a top of the can,
    wherein the gasification member comprises at least one material selected from the group consisting of cyclo hexyl benzene (CHB) and biphenyl (BP).

2. The cylindrical lithium ion secondary battery as claimed in claim 1, wherein the heating member further has a non-flammable member mounted thereon, the non-flammable member being configured to gasify at a predetermined temperature and suppress an occurrence of fire.

3. The cylindrical lithium ion secondary battery as claimed in claim 2, wherein the heating member is a fuse which melts and is cut off in its operation when the non-flammable member completely gasifies and the temperature reaches 200-300° C.

4. The cylindrical lithium ion secondary battery as claimed in claim 2, wherein the non-flammable member comprises at least one material selected from the group consisting of a magnesium hydroxide-based material, an aluminum hydroxide-based material, a halogen-based material, an antimony trioxide-based material, a melamine-based material, and a phosphate-based material.

* * * * *